United States Patent
Hess et al.

(10) Patent No.: US 11,716,614 B2
(45) Date of Patent: Aug. 1, 2023

(54) SECURED DATA DERIVATION FOR USER DEVICES

(71) Applicant: Comcast Cable Communications, LLC, Philadelphia, PA (US)

(72) Inventors: Bradley Hess, Philadelphia, PA (US); Nikola Kolev, Devon, PA (US); Kyong Park, Haverford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 161 days.

(21) Appl. No.: 15/998,493

(22) Filed: Aug. 16, 2018

(65) Prior Publication Data
US 2020/0059780 A1 Feb. 20, 2020

(51) Int. Cl.
| | |
|---|---|
| H04W 12/04 | (2021.01) |
| H04W 4/50 | (2018.01) |
| H04W 12/06 | (2021.01) |
| H04L 9/40 | (2022.01) |
| H04L 9/14 | (2006.01) |
| H04L 9/32 | (2006.01) |
| H04L 9/08 | (2006.01) |

(52) U.S. Cl.
CPC ........... *H04W 12/04* (2013.01); *H04L 9/0861* (2013.01); *H04L 9/14* (2013.01); *H04L 9/3247* (2013.01); *H04L 63/0428* (2013.01); *H04W 4/50* (2018.02); *H04W 12/06* (2013.01)

(58) Field of Classification Search
CPC ......... H04W 12/04; H04L 9/0861; H04L 9/14
USPC ....................................................... 380/270
See application file for complete search history.

(56) References Cited

U.S. PATENT DOCUMENTS

| | | | | |
|---|---|---|---|---|
| 8,107,629 | B2* | 1/2012 | Ryu | H04W 12/0433 455/410 |
| 8,112,794 | B2* | 2/2012 | Little | H04L 63/104 726/20 |
| 8,254,571 | B1* | 8/2012 | Boyen | H04L 9/08 380/44 |
| 2003/0169882 | A1* | 9/2003 | Rose | H04L 9/0861 380/281 |
| 2006/0010324 | A1* | 1/2006 | Appenzeller | H04L 9/083 713/171 |
| 2006/0101270 | A1* | 5/2006 | Laitinen | H04L 9/321 713/176 |
| 2011/0145897 | A1* | 6/2011 | Tyree | G06F 21/42 726/6 |
| 2013/0315393 | A1* | 11/2013 | Wang | H04W 12/06 380/270 |
| 2015/0208236 | A1* | 7/2015 | Xu | H04B 1/406 380/270 |
| 2016/0330617 | A1* | 11/2016 | Zhang | H04W 12/08 |
| 2017/0201520 | A1* | 7/2017 | Chandoor | H04W 12/35 |
| 2018/0006815 | A1* | 1/2018 | Young | H04L 9/0891 |

(Continued)

*Primary Examiner* — Dant B Shaifer Harriman
(74) *Attorney, Agent, or Firm* — Banner & Witcoff, Ltd.

(57) ABSTRACT

Methods, apparatuses, and systems are described for deriving secured keys and authenticating based on the derived keys. An entity may receive one or more derived keys and one or more key derivation algorithms associated with the one or more derived keys. A user device may derive, based on a key associated with the user device and unknown to the entity, a user key. The entity may derive, based on a first derived key and one of the key derivation algorithms, a second derived key, and may verify, based on the second derived key, the user key.

23 Claims, 16 Drawing Sheets

(56) References Cited

U.S. PATENT DOCUMENTS

2019/0013937 A1\* 1/2019 Leong ................... H04L 63/06
2019/0223014 A1\* 7/2019 Deshpande ........... H04W 12/06

\* cited by examiner

KeyDerivationAlgorithm1 (KDA1)
(KDA1 is associated with an input message "Comcast", a final iteration quantity "n", and an intermediate iteration quantity "k")

Stage 1 key value:stg_1 = KDA1 (master key, Comcast)
Stage 2 key value:stg_2 = KDA1 (stg_1, Comcast)
...
Stage k key value: stg_k = KDA1 (stg_k-1, Comcast)

-> Store Stage k key value associated with KDA1 and send, to the service provider 320, the stage k key value and KDA1, (n-k), and Comcast

FIG. 3C

SECURED DATA DERIVATION FOR USER DEVICES

BACKGROUND

A computing device may perform a provisioning process or other communications with user devices. In order to provide a secure provisioning service or other secure communications, the computing device and each user device may share a shared secret to protect communications between them. For example, the computing device may store secret information (e.g., secret keys) of a plurality of user devices in a data center. However, the secret information of the plurality of user devices could be compromised.

SUMMARY

The following presents a simplified summary of certain features. The summary is not an extensive overview, and is not intended to identify key or critical elements.

Systems, apparatuses, and methods are described for deriving secured data for user devices. A computing device of a second entity may receive, from a first entity, one or more key derivation algorithms associated with a user device and one or more derived keys associated with the user device. The one or more derived keys may be derivable from a secret key stored in the user device and the one or more key derivation algorithms. The secret key may be maintained by the first entity, but may remain unknown to the second entity. A key derivation algorithm mutually supported by the computing device and the user device may be selected. The user device may derive a user key from the secret key and the selected key derivation algorithm. The computing device may receive the user key from the user device and may verify the user key based on one of the derived keys received from the first entity. Because the second entity does not have secret keys of user devices and key derivation algorithms may be updated and/or replaced and/or new derived keys provided, secret keys of user devices may be protected from various security threats.

These and other features and advantages are described in greater detail below.

BRIEF DESCRIPTION OF THE DRAWINGS

Some features herein are shown by way of example, and not by way of limitation, in the accompanying drawings. In the drawings, like numerals reference similar elements.

FIG. 3C shows example operations that may be performed by a secure key facility.

DETAILED DESCRIPTION

Figure 1:
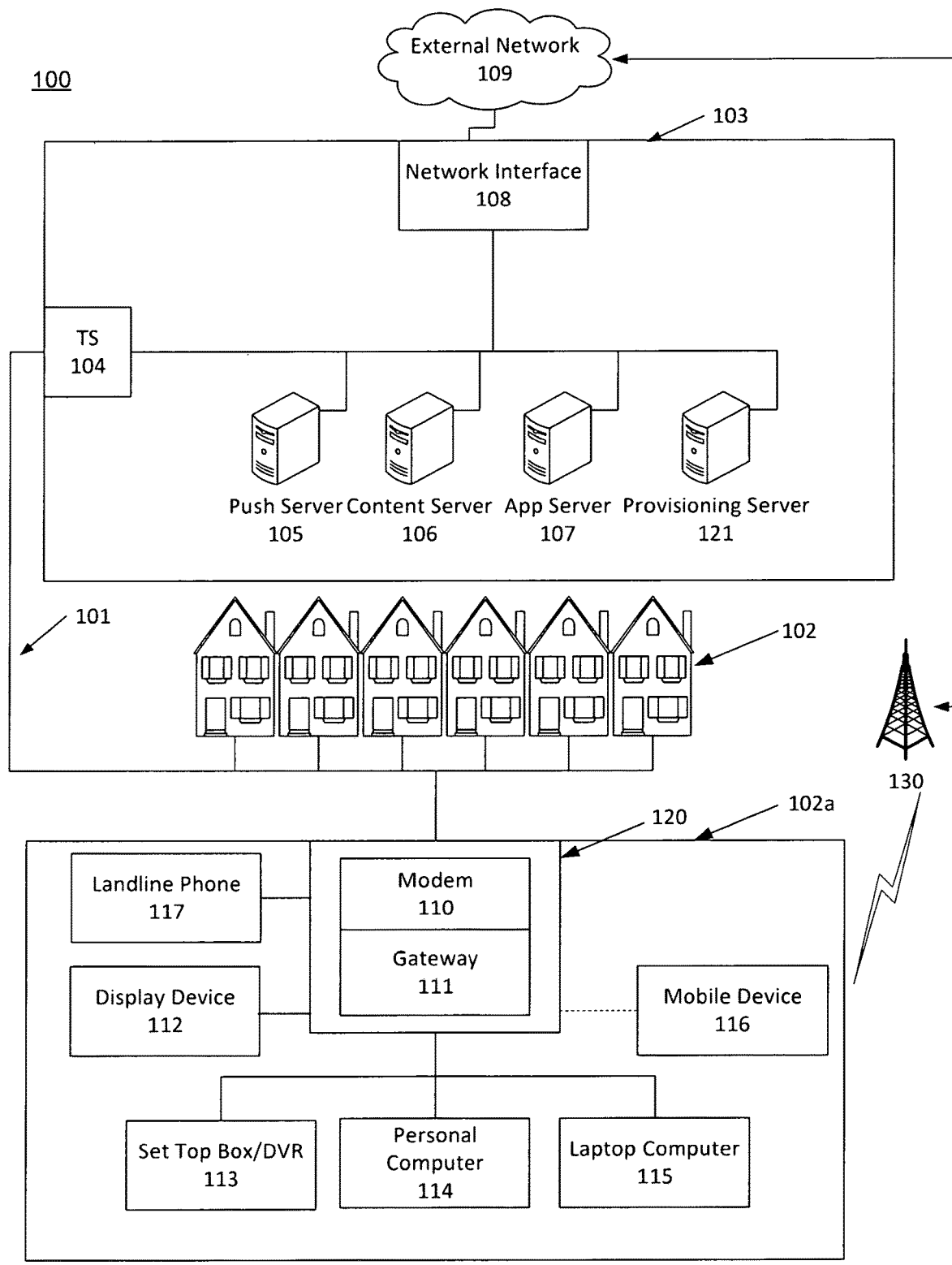
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

The communication links 101 may originate from the local office 103 and may be split to exchange information signals with the various premises 102. The communication links 101 may include components not illustrated, such as splitters, filters, amplifiers, etc. to help convey the signal clearly. The communication links 101 may be coupled, via the external network 109 or other networks, to an access point 130 (e.g., a base station of a cellular network, a Wi-Fi access point, etc.) configured to provide wireless communication channels to communicate with one or more mobile devices 116. The mobile devices 116 may include cellular mobile devices, and the wireless communication channels may be Wi-Fi IEEE 802.11 channels, cellular channels (e.g., LTE), and/or satellite channels. In addition to the mobile devices 116, user devices located at or otherwise associated with the premises 102 may comprise, without limitation, a modem 110, a gateway 111, a display device 112, a set top box/DVR 113, a personal computer 114, a laptop computer 115, a landline phone 117, and/or other devices.

The local office 103 may include an interface 104, such as a termination system (TS). The interface 104 may be a cable modem termination system (CMTS), which may be a computing device configured to manage communications between devices on the network of the communication links 101 and backend devices such as servers 105-107. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with the various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 116 (e.g., cell phones, smartphone, tablets with cellular radios, laptops communicatively coupled to cellular radios, etc.) via the interface 108. The local office 103 may include one or more provisioning servers 121. The external network 109 and/or the access point 130 may include a provisioning system similar to the one or more provisioning servers 121.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at the premises 102. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The local office 103 may include additional servers, including additional push, content, and/or application servers, and/or other types of servers. Although shown separately, the push server 105, the content server 106, the application server 107, and/or other server(s) may be combined. The servers 105, 106, 107, 121, and/or other servers, may be computing devices and may include memory storing data and also storing computer executable instructions that, when executed by one or more processors, cause the server(s) to perform steps described herein. The one or more provisioning servers 121 may be one or more computing devices that may be configured to verify an identity (e.g., a MAC address, etc.) of a user device (e.g., a set-top box, gateway interface, etc.) and carry out provisioning of the user device. The one or more provisioning servers 121 may deliver encrypted provisioning materials and/or key derivation algorithms to the user device for running firmware updates. The provisioning server 121, other provisioning systems and various devices in the premises 102 may perform operations such as described herein.

An example premise 102a may include an interface 120. The interface 120 may include any communication circuitry used to communicate via one or more of the links 101. The interface 120 may include the modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include the gateway 111 (e.g., a gateway interface device). The modem 110 may be connected to, or be a part of, the gateway 111. The gateway 111 may be a computing device that communicates with the modem(s) 110 to allow one or more other devices in the premises 102a to communicate with the local office 103 and other devices beyond the local office 103. The gateway 111 may comprise a set-top box (STB), digital video recorder (DVR), a digital transport adapter (DTA), an embedded Digital Voice Adaptor (eDVA), an embedded Media Terminal Adaptor (eMTA), a computer server, and/or any other desired computing device. The gateway 111 may also include local network interfaces to provide communication signals to requesting entities/devices in the premises 102a, such as the display devices 112 (e.g., televisions), the additional STBs or DVRs 113, the personal computers 114, the laptop computers 115, the mobile devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), the landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at the premise 102a may be configured to provide wireless communications channels (e.g., IEEE 802.11 channels) to communicate with the mobile devices 116. The modem 110 (e.g., access point) or the mobile devices 116 (e.g., router, tablet, laptop, etc.) may wirelessly communicate with one or more other mobile devices, which may be on- or off-premises.

The mobile devices 116 may communicate with the local office 103 including, for example, with the servers 105, 106, 107, and 121. The mobile devices 116 may also be wearable devices (e.g., a smart watch, electronic eye-glasses, etc.), or any other mobile computing device. The mobile devices 116 may store, output, and/or otherwise use assets. An asset may be a video, a game, one or more images, software, audio, text, webpage(s), and/or other content. The mobile devices 116 may include Wi-Fi transceivers, cellular transceivers, satellite transceivers, and/or global positioning system (GPS) components.

Figure 2:
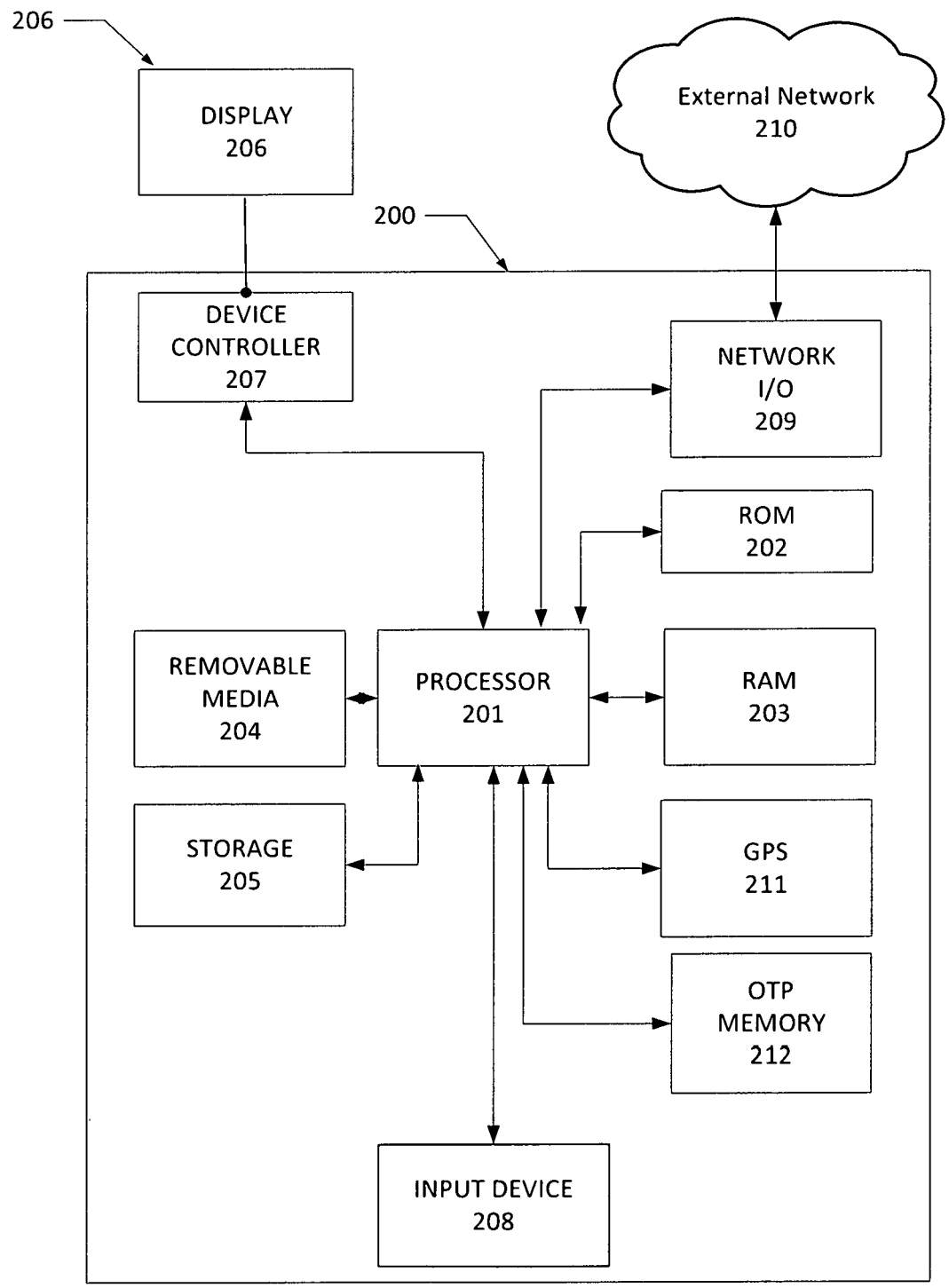
FIG. 2 shows example hardware elements of a computing device.

FIG. 2 shows example hardware elements of a computing device that may be used to implement any of the computing devices discussed herein (e.g., a user device, a computing device, etc. that may perform part or all of one or more of the processes and/or operations described herein). The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) storage 205 (e.g., hard drive, flash, etc.). The computing device 200 may include one or more output devices, such as a display 206 (e.g., an external television, video monitor, or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device. The computing device 200 may include a one-time-programmable memory 212. The computing device 200, or a combination of computing devices 200, may perform one or more operations of a computing device of a secure key facility, one or more operations of a user device, one or more operations of a provisioning system, and/or one or more other operations described herein.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
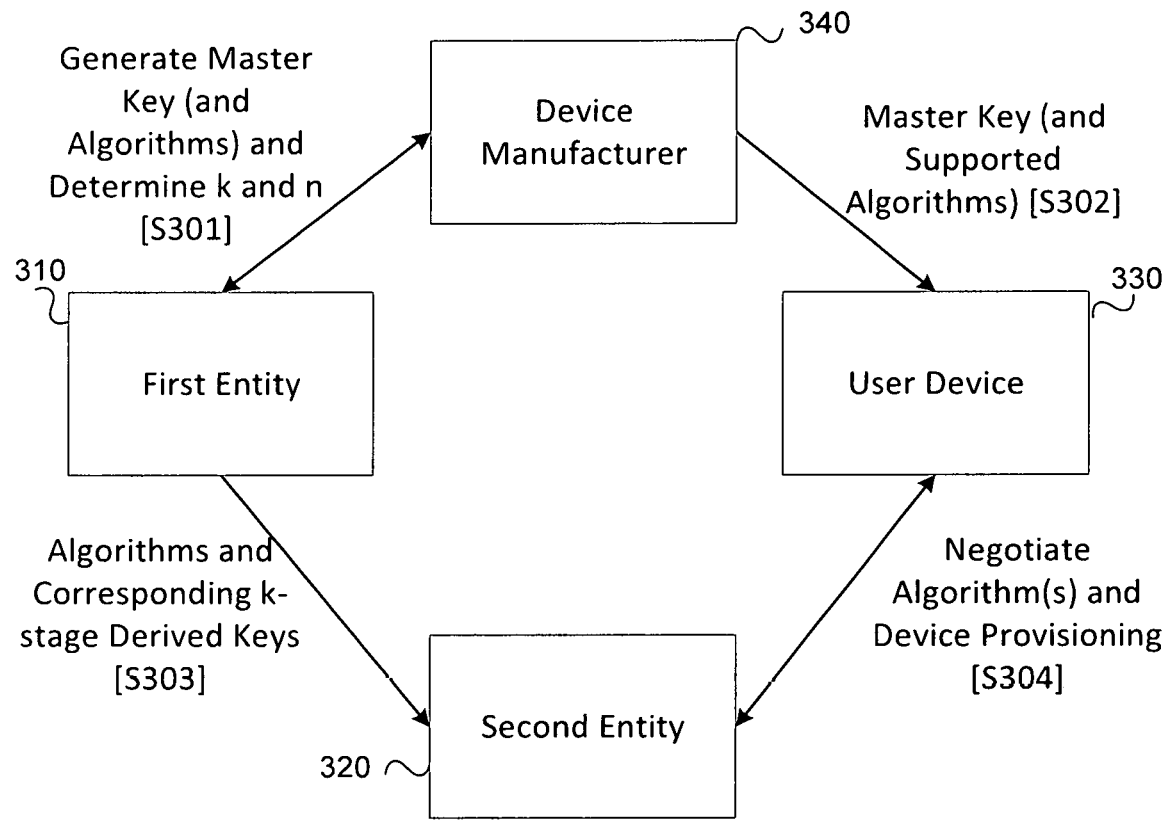
FIG. 3A shows an example operating environment.

FIG. 3A shows an example operating environment 300. One or more computing devices of a first entity (e.g., a secure key facility) 310 may generate and store a master key for a user device 330 and may send the master key to a manufacturer 340 associated with the user device 330 (step S301). The manufacturer 340 may be a manufacturer of the user device or of a component (e.g., one or more integrated circuits) to later be incorporated into the user device (step S302). The master key may be a secret key that may be uniquely linked with the user device 330 and may not change over the lifespan of the user device 330. For example, the master key may be burned into a one-time-programmable memory component of the user device 330 by the manufacturer 340 or may otherwise be permanently stored in a component (e.g., a hardware chip) of the user device 330. The first entity 310 may derive, based on one or more key derivation algorithms, one or more k-stage derived keys from the master key. The first entity 310 may provide a second entity (e.g., a service provider, a network operator, or some other type of entity) 320 with the one or more k-stage derived keys and the one or more key derivation algorithms associated with the one or more k-stage derived keys (step S303). The value k may be a positive integer and may be different for each k-stage derived key (e.g., k=5 for key derivation algorithm1 for a first user device and k=9 for key derivation algorithm3 for a second user device). Based on a first derived key (e.g., one of the k-stage keys from the first entity 310) and on a second derived key generated by the user device 330 (e.g., based on the master key permanently stored in the user device 330), one or more computing devices of the second entity 320 (e.g., the provisioning server 121) may authenticate the user device 330 and perform a device provisioning for the user device 330 based on that authentication (step S304).

The first entity 310 may optionally send one or more key derivation algorithms to the device manufacturer 340, and the device manufacturer 340 may implement the received one or more key derivation algorithms in a firmware of the user device 330. The one or more key derivation algorithms in the firmware of the user device 330 may execute as a specific hardware function of the firmware of the user device 330.

Figure 3B:
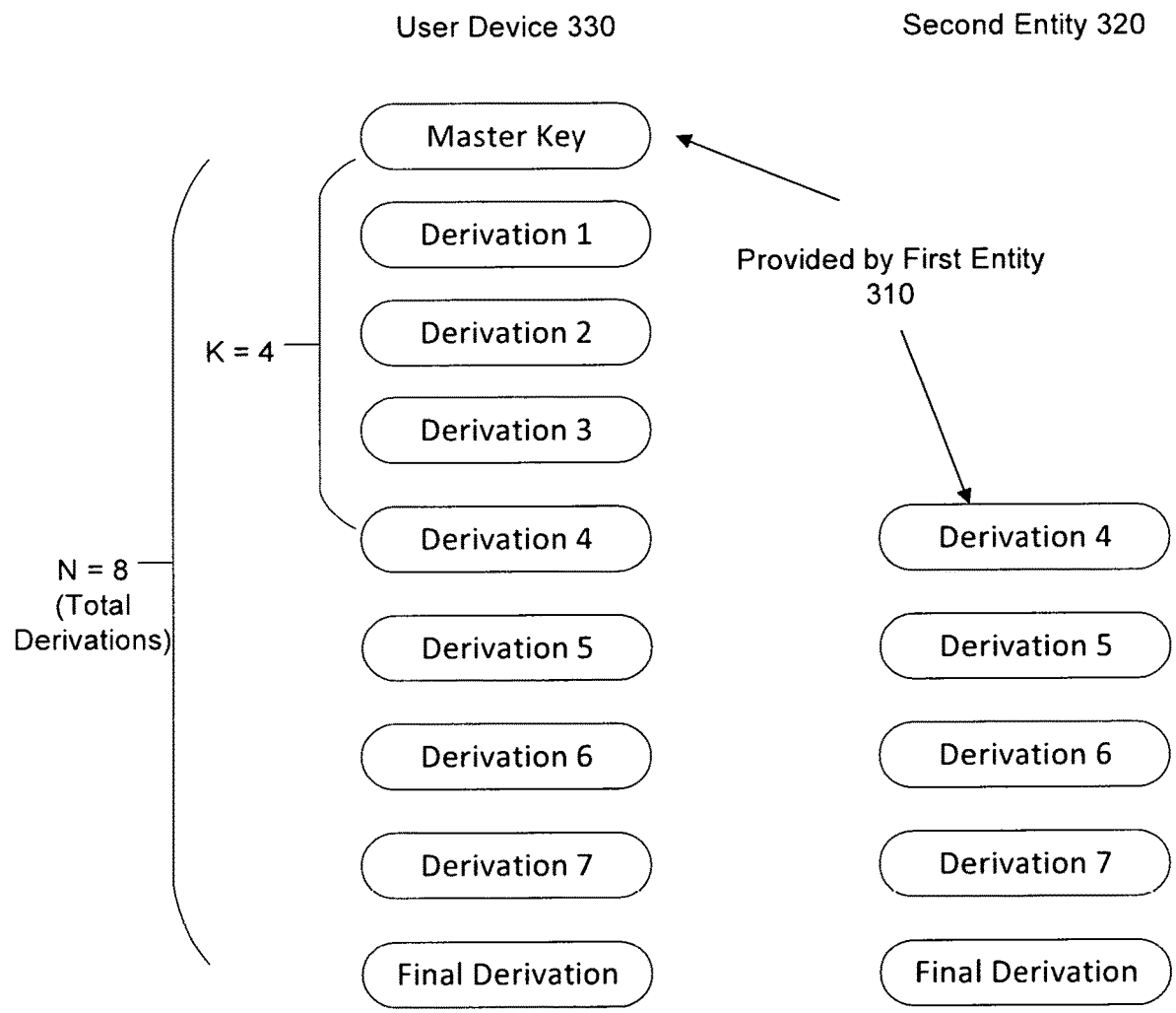
FIG. 3B shows example key derivations by a user device and by a service provider.

FIG. 3B shows example key derivations by the user device 330 and by the second entity 320. The user device 330 may begin its key derivations with the master key. The user device 330 may retrieve the master key from permanent storage within the user device 330 and may use the master key as an initial input to a key derivation algorithm. Based on a first iteration of the key derivation algorithm using the master key as the initial input, the user device 330 may obtain a 1-stage derived key. The user device 330 may use the 1-stage derived key as an input to a second iteration of the selected key derivation algorithm. Based on the second iteration of the key derivation algorithm using the 1-stage derived key as the input, the user device 330 may obtain a 2-stage derived key. The user device 330 may repeat these operations for a total of n iterations to obtain an n-stage derived key, with n=8 in FIG. 3B example.

For convenience, FIG. 3B and subsequent figures refer to operations of the second entity 320, it being appreciated that such operations may be performed by one or more computing devices of the second entity 320. Similarly, operations described as performed by the first entity 310 may be performed by one or more computing devices of the first entity. Moreover, operations described as performed by a user device may be performed by one or more computing devices, e.g., distributed among multiple user devices or other computing devices. The second entity 320 may not have the master key. Instead, the second entity 320 may begin its iterations with a k-stage derived key provided by the first entity 310. Using the same key derivation algorithm used by the user device 330, the second entity 320 may use the k-stage key as an initial input to a first iteration of that key derivation algorithm. The second entity 320 may use the output of that first iteration as an input to a second iteration, and may repeat for a total of n-k iterations. The final derivation by the second entity 320 results in an n-stage (from the master key) derived key that matches the n-stage derived key derived by the user device 330. The user device 330 may provide its final derived key (or a hash or other value based on the final derived key of the user device 330) to the second entity 320, which may compare it to the final derived key derived by the second entity 320 (or to a hash or other value based on the final derived key derived by the second entity 320). Upon determining a match, the second entity 320 may authenticate the user device 330 and perform provisioning and/or other operations. Because the second entity 320 may perform provisioning and authentication processes with the user device 330 without possessing the master key of the user device 330, the master key of the user device 330 may be secured in a highly secured entity, such as the secure key facility 310. Transient key materials (e.g., derived keys and corresponding key derivation algorithms) to be used for various secured services (e.g., user device provisioning, secure video playback, etc.) may be provided in a less trusted environment. Should any of those transient key materials become compromised or otherwise undesirable to use, new transient key materials (e.g., new derived keys and/or new key derivation algorithms) can be generated by the first entity 310.

The user device 330 and the second entity 320 may each support multiple key derivation algorithms. Prior to performing key derivations, one of the second entity 320 or the user device 330 may select a mutually-supported algorithm and indicate that selection to the other of the second entity 320 or the user device 330. For example, the user device 330 may send a message to the second entity 320 requesting an authentication challenge, which message may indicate key derivation algorithms supported by the user device 330. The second entity 320 may select one of those algorithms and indicate that selection in an authentication challenge to the user device 330.

The following pseudocode provides an example of how the user device 330 may generate a derived key using a key derivation algorithm.

```
i = 0
keyD(0) = keyM
WHILE i < n
    increment i by +1
    keyD(i) = KDA(keyD(i-1), <params>)
ENDWHILE
keyD_UD = keyD(i)
```

In the above pseudocode, "keyM" is the master key for the user device 330, "i" is an iteration counter, and "keyD(i)" is an $i^{th}$ stage (from the master key) derived key. "KDA( )" indicates a key derivation algorithm KDA that receives, as inputs, the elements between the parentheses. A key derivation algorithm may be selected by the first entity 310 such that it is computationally impractical to derive the master key from a derived key, even if the key derivation algorithm is known. Any of various hashing algorithms may be used as a key derivation algorithm. For example, a key derivation algorithm may comprise a hash-based message authentication algorithm that uses one or more cryptographic hash functions (e.g., MD5, SHA-1, SHA-256, etc.). A key derivation algorithm may also or alternatively include other encrypting processes.

One of the inputs to the key derivation algorithm KDA( ) for the $i^{th}$ iteration is the $(i-1)^{th}$ stage derived key. The key derivation algorithm KDA( ) may also include one or more additional input parameters, shown generically as "<params>." The one or more additional parameters may be added for additional security. For example, <params> may be a message or other selected element. The additional <params> input(s) may be omitted. The derived key generated by the user device 330 based on the n iterations is shown in the above pseudocode as "keyD_UD." This derived key, or a hash, secure message authentication code (SMAC), or other value based on that derived key, may be sent to the second entity 320 for authentication of the user device 330.

The following pseudocode provides an example of how the same key derivation algorithm KDA( ) may be used by the second entity 320 to obtain a derived key for comparison with a derived key received from the user device 330 (or for use in generating a hash, SMAC or other value to be compared to the hash or other value received from the user device 330).

```
j = 0
keyD(0) = keyD(k)
WHILE j < (n-k)
    increment j by +1
    keyD(j) = KDA(keyD(j-1), <params>)
ENDWHILE
keyD_SP = keyD(j)
```

In the above pseudocode, "keyD(k)" is a k-stage (from the master key) derived key. The second entity 320 may receive keyD(k) for the user device 330 from the first entity 310. The variable "j" is an iteration counter, and "keyD(j)" is a derived key resulting from j iterations of a key derivation algorithm that begins with keyD(k) as an initial input. "KDA( )" is the same key derivation algorithm used by the user device 330. The derived key generated by the service provider based on the n−k iterations is shown in the above pseudocode as "keyD_SP." This derived key may be compared to the derived key received from the user device 330 for authentication of the user device 330, e.g., the user device 330 may be determined authentic if keyD_SP=keyD_UD. Alternatively, a hash, SMAC, or other value based on KeyD_SP ("H(KeyD_SP)") may be compared to a hash or other value based on KeyD_UD ("H (KeyD_UD)") and received from the user device 330, and the user device 330 may be determined to be authentic if H(KeyD_SP)=H(KeyD_UD).

In the example of FIG. 3B, n=8 and k=4. The variables n and k may have any positive integer values; n may be greater than k.

For authentication of the user device 330, the second entity 320 may not receive the $n^{th}$ stage derived key (e.g., keyD_UD) generated by the user device 330. Instead, the second entity 320 may send, to the user device 330, a request to provide a SMAC. For example, the request to provide an SMAC may comprise a temporary message and instructions to generate the SMAC using the temporary message and a message authentication algorithm. The message authentication algorithm may be the selected algorithm "KDA( )" mutually supported by the second entity 320 and the user device 330 (or another algorithm mutually supported by the second entity 320 and the user device 330). Based on receiving the request to provide the SMAC, the user device 330 may generate the SMAC by executing the message authentication algorithm with the $n^{th}$ stage derived key (e.g., keyD_UD) and the received temporary message as inputs. The following equation provides an example of how the SMAC may be derived.

SMAC=KDA(keyD_UD, temporary message)

The user device 330 may send the SMAC to the second entity 320. The second entity 320 may receive the SMAC from the user device 330 and may generate. SMAC_SP by executing the message authentication algorithm with the key derived by the second entity 320 (e.g., keyD_SP) and the temporary message as inputs. The following equation provides an example of how the SMAC_SP is derived.

SMAC_SP=KDA(keyD_SP, temporary message)

The second entity 320 may authenticate the received SMAC by comparing the received SMAC with the generated SMAC_SP. If the received SMAC matches the generated SMAC_SP, the second entity 320 may successfully authenticate the user device 330 and may provide one or more services to the user device 330.

FIG. 3C shows example operations that may be performed by the first entity 310. The operations of FIG. 3C may be performed by one or more computing devices of the first entity 310 in connection with providing derived keys and related information to the second entity 320 and to the user device 330. In step S301 in FIG. 3A, the first entity 310 may determine a key derivation algorithm 1 ("KDA1"), an intermediate iteration quantity k, and a final iteration quantity n. The intermediate iteration quantity k may be a number of iterations of KDA1 to be performed by the computing device to generate a derived key for furnishing to the second entity 320. The final iteration quantity n may be the number of iterations of KDA1 to be performed by the user device 330 when performing authentication based on KDA1. The secure key facility 310 may select a master key associated with the user device 330 and that may be used as an initial input to KDA1 by the first entity 310 and by the user device 330. The first entity 310 may also determine that one or more additional parameters will be used for iterations of KDA1. For example, the message "Comcast" may be used as an input for all iterations of KDA1 performed by the first entity 310, by the user device 330, and by the second entity 320. The first entity 310 may determine the message based on input from the second entity 320 (e.g., the second entity 320 may select the message to be used). Inclusion of a message and/or of other <params> input(s) to a key derivation may be optional.

The master key associated with the user device 330 and the message "Comcast" may be used as inputs for the first iteration of KDA1, and the first stage (1-stage) key "stg_1" may be obtained as an output of the first iteration. The 1-stage key "stg_1" and the message "Comcast" may be used as inputs for the second iteration of KDA1, and the second stage (2-stage) key "stg_2" may be obtained as an output of the second iteration. This may be repeated through the $k^{th}$ iteration of KDA1, resulting in the k-stage key "stg_k." In step S303 in FIG. 3A, the first entity 310 may send, to the second entity 320, the k-stage key "stg_k" and the KDA1 algorithm. The first entity 310 may also send information to the second entity 320 indicating that, when KDA1 is used for authentication, a specific number of iterations equal to n–k should be performed. The first entity 310 need not inform the second entity 320 of the values of n and k, and may instead simply provide an integer value equal to n–k. Alternatively, values for n and for k could be furnished to the second entity 320. If the message "Comcast" or other <params> input(s) to KDA1 is not already known to the second entity 320, the first entity 310 may send that information to the second entity 320.

The first entity 310 may also furnish to the user device 330, and/or facilitate the furnishing to the user device 330, of KDA1, together with information indicating that, when KDA1 is used for authentication, n iterations should be performed. The message "Comcast" or other <params> input(s) to KDA1 may be furnished to the user device 330 from the second entity 320 and/or other source, and/or the first entity 310 may send (and/or facilitate the sending) of that information to the user device 330.

The first entity 310 may perform numerous series of operations such as those shown FIG. 3C. For each series of such operations, any or all of the determined key derivation algorithm, the value of n, the value of k, the message (and/or whether to include a message), and other <params> (and/or whether to include one or more other <params>) may be varied. The results of such series of operations may be provided to the second entity 320 and to the user device 330 as alternatives and/or as replacement(s) (e.g., if the security of previously-provided information becomes compromised) for use in authentication.

Figure 4A:
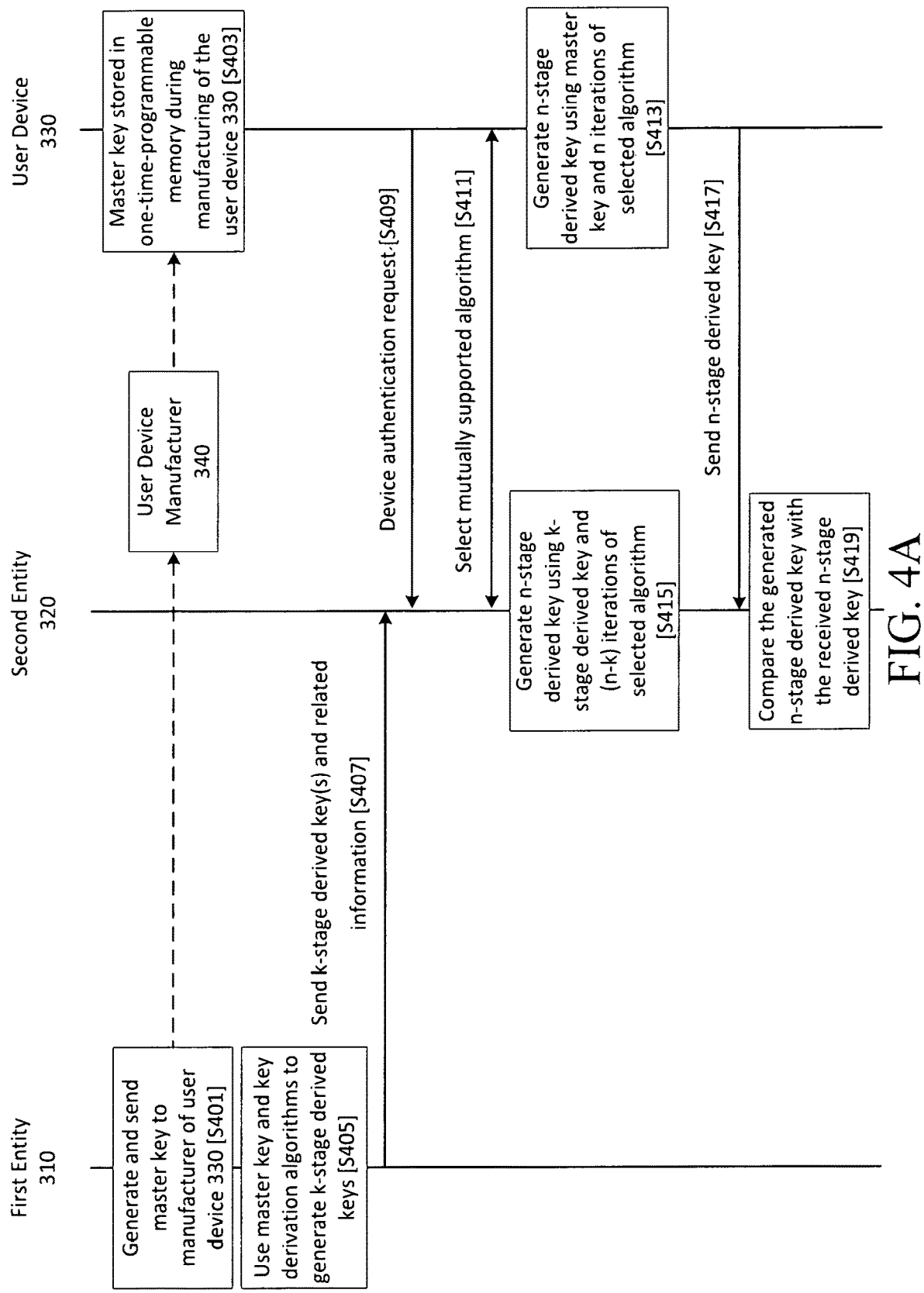
FIG. 4A is a message flow chart showing an example method for authenticating a user device using a mutually supported key derivation algorithm.

FIG. 4A is a message flow chart showing an example method for authenticating a user device using a mutually supported key derivation algorithm. In FIG. 4A, reference numbers for steps are indicated with square brackets ("[ ]") for clarity. In step S401, the first entity 310 may generate and send a master key to a user device manufacturer 340 of a user device 330. In step S403, the user device manufacturer 340 may store the master key in a one-time-programmable memory of the user device 330 during the manufacturing process of the user device 330. The master key may be a unique, secret key for the user device 330. In step S405, the first entity 310 may use the master key and one or more key derivation algorithms to generate one or more k-stage derived keys by performing series of operations such as those described in connection with FIG. 3C. In step S407, the first entity 310 may send, to the second entity 320, the k-stage derived key(s) and related information (e.g., the key derivation algorithm associated with each derived key, an indication of the number (n–k) of iterations to be performed with each associated key derivation algorithm, information regarding other inputs (<params>) to each associated key derivation algorithm). The second entity 320 may receive and store the information.

In step S409, the user device 330 may send, to the second entity 320, a device authentication request. The request of step S409 may be a request for the second entity 320 to send an authentication challenge to the user device 330. The request may also indicate key derivation algorithms supported by the user device 330. Based on receiving the device authentication request, the second entity 320 may select, in step S411, a key derivation algorithm (e.g., from a list in the request of step S409) that is mutually supported by the second entity 320 and the user device 330. In step S413, the user device 330 may generate a derived key using the master key of the user device 330 and n iterations of the selected key derivation algorithm. In step S415, the second entity 320 may generate a derived key by using the k-stage derived key associated with the selected key derivation algorithm and performing the required number (n–k) of iterations. In step S417, the user device 330 may send, to the second entity 320, the derived key generated by the user device 330 in step S413. Alternatively, in step S417, the user device 330 may send, to the second entity 320, the SMAC. In step S419, the second entity 320 may compare the derived key generated by the second entity 320 (or the SMAC_SP) in step S415 with the derived key (or the SMAC) received from the user device 330 in step S417. If the authentication is successful, e.g., if the two derived keys match (or the SMAC and the SMAC_SP match), the second entity 320 may send provisioning materials and/or provide one or more other services to the user device 330.

Figure 4B:
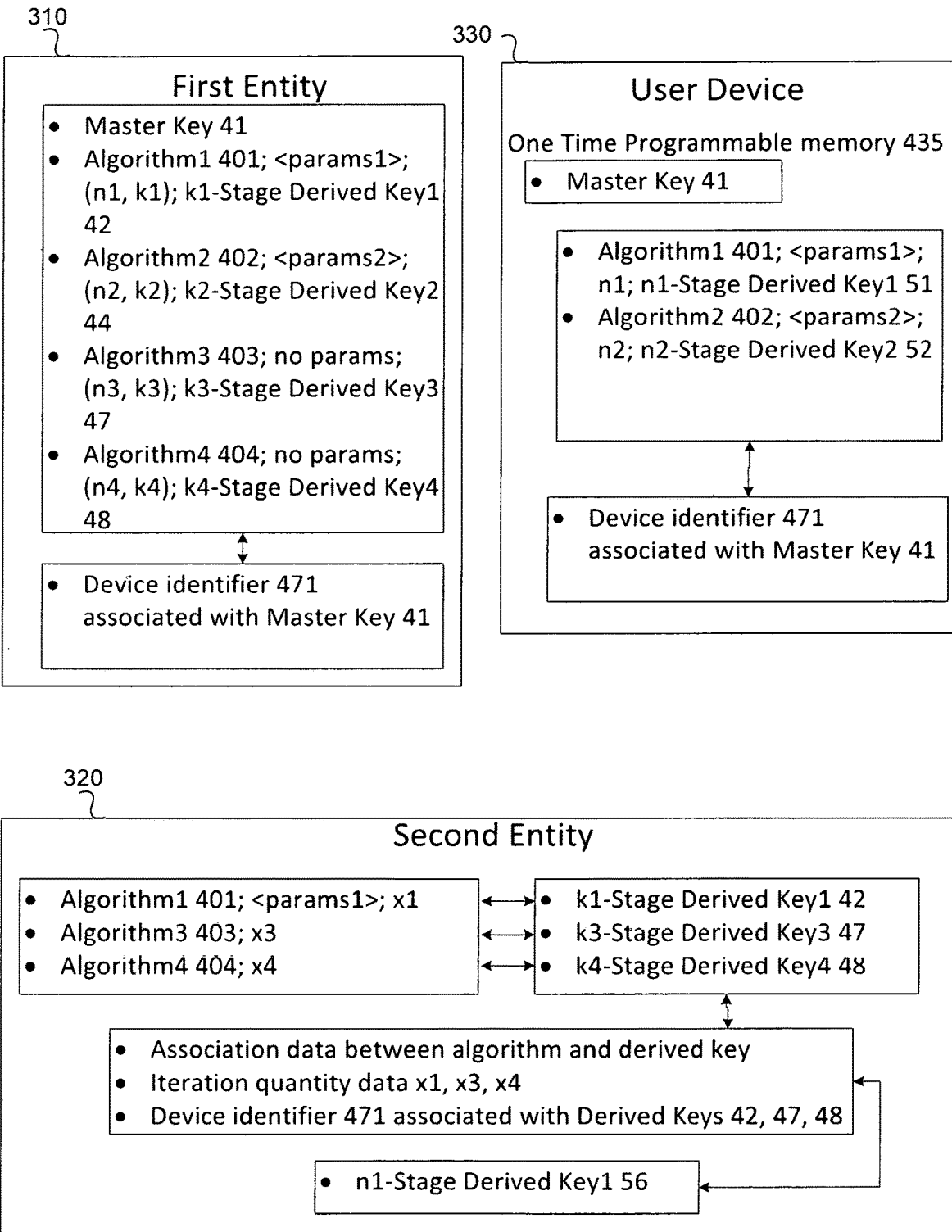
FIG. 4B shows a plurality of entities storing keys and associated key derivation algorithms.

FIG. 4B shows a plurality of entities storing keys and associated key derivation algorithms. The first entity 310 may store master keys and other information for each of a plurality of user devices. Each of the user devices for which the first entity 310 stores data may be identified by a device serial number, by a media access control (MAC) address, and/or by some other unique identifier. For example, the first entity 310 may generate and store a master key 41 associated with the user device 330. The secure key facility 310 may also generate and store one or more algorithms to be associated with the master key 41 (e.g., an algorithm1 401, an algorithm2 402, an algorithm3 403, and an algorithm4 404). The first entity 310 may assign different values of n and k (e.g., (n1, k1), (n2, k2), etc.) to each algorithm. The first entity 310 may derive and store a k1-stage derived key1 42 from the master key 41 by using the algorithm1 401. In a similar manner, the first entity 310 may derive a k2-stage derived key2 44, a k3-stage derived key3 47, and a k4-stage derived key4 48. The first entity 310 may store different additional input parameters (e.g., (<params1>, <params2>, etc.) for each algorithm. For example, the algorithm1 401 may use the additional input parameters <params1> and the algorithm2 402 may use the additional input parameters <params2>. The algorithm3 403 and the algorithm4 404 may not use additional input parameters when executing each iteration of the algorithms. The first entity 310 may store device identifiers comprising a device identifier 471 of the user device 330, which may be associated with the master key 41 and with the other information (e.g., algorithms, derived keys, etc.) associated with the master key 41.

The user device 330 may store the master key 41 in a one-time-programmable memory 435 of the user device 330. The user device 330 may also store algorithms comprising the algorithm1 401 and algorithm2 402. The different iteration values of n (e.g., n1 and n2) may be assigned to the algorithm1 401 and algorithm2 402, respectively. The user device 330 may derive and store an n1-stage derived key1 51 from the master key 41 by using the algorithm1 401 and may derive and store an n2-stage derived key2 52 from the master key 41 by using the algorithm2 402. The user device 330 may store different additional input parameters (e.g., (<params1>, <params2>, etc.) for each algorithm. The algorithms, input parameters, and n values stored in the user device 330 may be received from the first entity 310 or the second entity 320. The user device 330 may permanently store the device identifier 471 of the user device 330.

The second entity 320 may receive and store the k1-stage derived key1 42, the k3-stage derived key3 47, and the k4-stage derived key4 48. The second entity 320 may also store the algorithm1 401, the algorithm3 403, and the algorithm4 404. The second entity 310 may receive and store different iteration values of x (e.g., x1, x3, x4, etc.) for each algorithm or may receive and store different values of n and k (e.g., (n1, k1), (n3, k3), (n4, k4) etc.) for each algorithm. The iteration value x1 may equal n1−k1, the iteration value x3 may equal n3−k3, and the iteration value x4 may equal n4−k4. For enhanced security, the first entity 310 may not let the second entity 320 know the values of n and k. Instead, the iteration values of x (e.g., x1, x3, x4, etc.) for each algorithm may be provided to the second entity 320. The second entity 320 may also store association data between the algorithm1 401 and the k1-stage derived key1 42, association data between the algorithm3 403 and the k3-stage derived key3 47, and association data between the algorithm4 404 and the k4-stage derived key4 48. The second entity 320 may derive and store an n1-stage derived key1 56 from the k1-stage derived key1 42 by using x1 iterations of the algorithm1 401. The second entity 320 may neither be aware of the value n1 after generating the n1-stage derived key1 56 nor be aware of the value k1 of the k1-stage derived key1 42 if the first entity 310 provides the value x1 instead of the value pair (n1, k1). The second entity 320 may store different additional input parameters (e.g., (<params1>, etc.) for each algorithm. The algorithms, input parameters, and x values (or (n, k) values) stored by the second entity 320 may be received from the first entity 310. The second entity 320 may store the device identifier 471 of the user device 330, which may be associated with the received k-stage derived keys (e.g., k1-stage derived key1 42, k3-stage derived key3 47, k4-stage derived key4 48, etc.) and with the other information (e.g., algorithms, x values, input parameters) associated with the k-stage derived keys.

Figure 5:
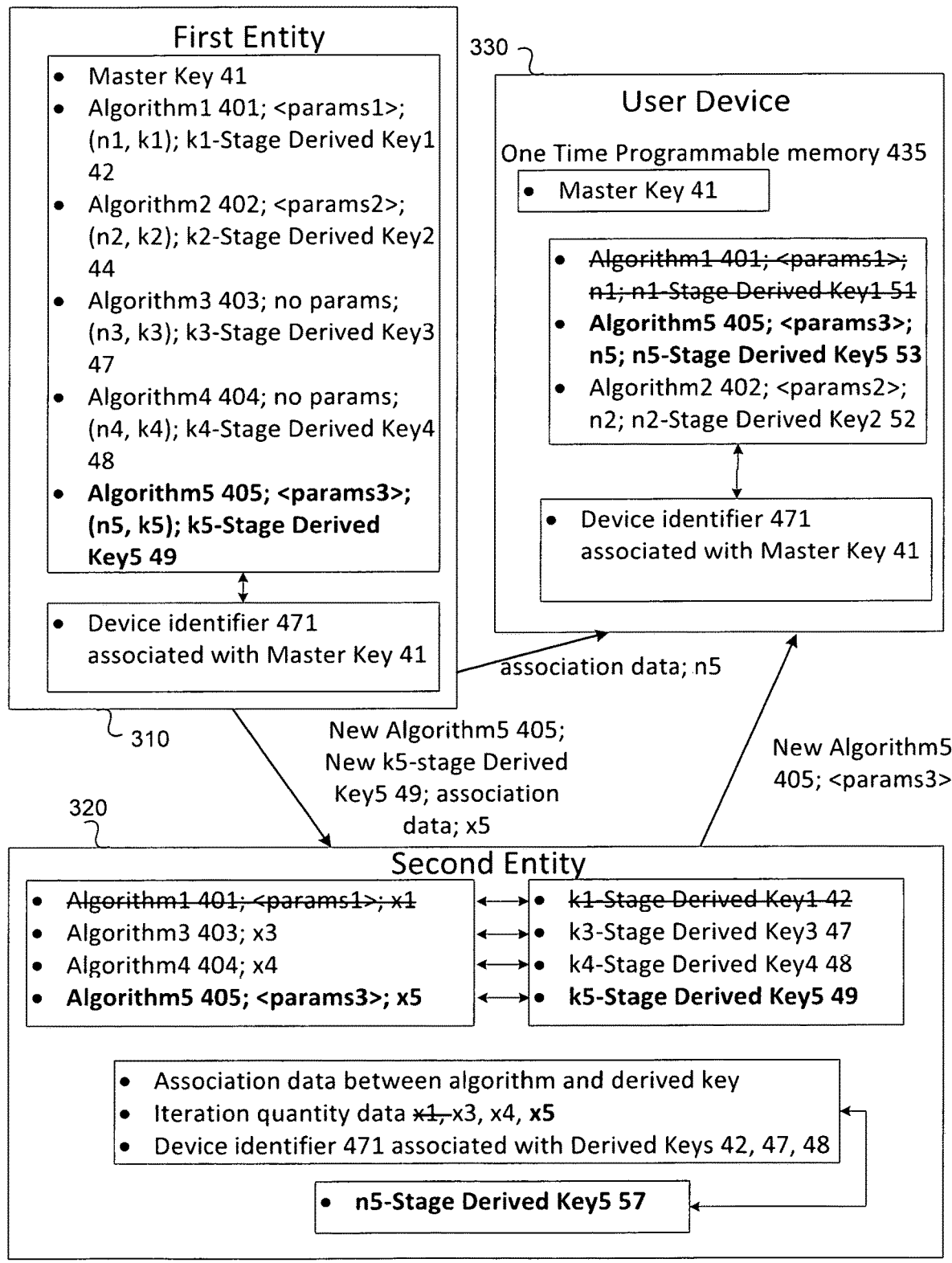
FIG. 5 shows a plurality of entities updating keys and associated key derivation algorithms.

FIG. 5 shows a plurality of entities updating keys and associated key derivation algorithms. The statuses of the entities shown in FIG. 5 may be updated relative to the statuses of the entities shown in FIG. 4B. The first entity 310 may generate and store a new algorithm5 405. The first entity 310 may determine an iteration value pair (n5, k5) and one or more additional input parameters <params3> associated with the new algorithm5 405. The first entity 310 may derive and store a k5-stage derived key5 49 from the master key 41 by using the algorithm5 405 with <params3>. The first entity 310 may send, to the second entity 320, the new algorithm5 405, the k5-stage derived key5 49, association data between the new algorithm5 405 and the k5-stage derived key5 49, and the iteration value x5 associated with the algorithm5 405. The first entity 310 may send the <param3> to the second entity 320, and the second entity 320 may send the <param3> to the user device 330. The iteration value x5 may equal n5-k5. The first entity 310 may send, to the user device 330, an iteration value of n5 and association data between n5 and the new algorithm5 405. Alternatively, if the first entity 310 sends (n5, k5) pair to the second entity 320 (instead of x5), the second entity 320 may send, to the user device 330, the value of n5 as well as the new algorithm5 405 and <params3>.

The second entity 320 may store the data (e.g., k5-stage derived key5 49, algorithm5 405, <params3>, etc.) received from the first entity 310. The second entity 320 may send, to the user device 330 via a secured channel, the new algorithm5 405 and <params3> (and n5 if the second entity 320 receives n5 from the first entity 310). The second entity 320 may eliminate or invalidate compromised algorithm1 401, <params1>, x1, and k1-stage derived key1 42 (shown as strikethrough). The second entity 320 may derive n5-stage derived key5 57 from the k5-stage derived key5 49 based on x5 iterations of the algorithm5 405 and <params3>.

The user device 330 may store and validate the new algorithm5 405 (shown as bolded) and may invalidate the algorithm1 401 (shown as strikethrough). The user device 330 may also store n5 and <params3> associated with the new algorithm5 405. The user device 330 may derive an n5-stage derived key5 53 from the master key 41 based on the algorithm5 405 and <params3>.

Figure 6A:
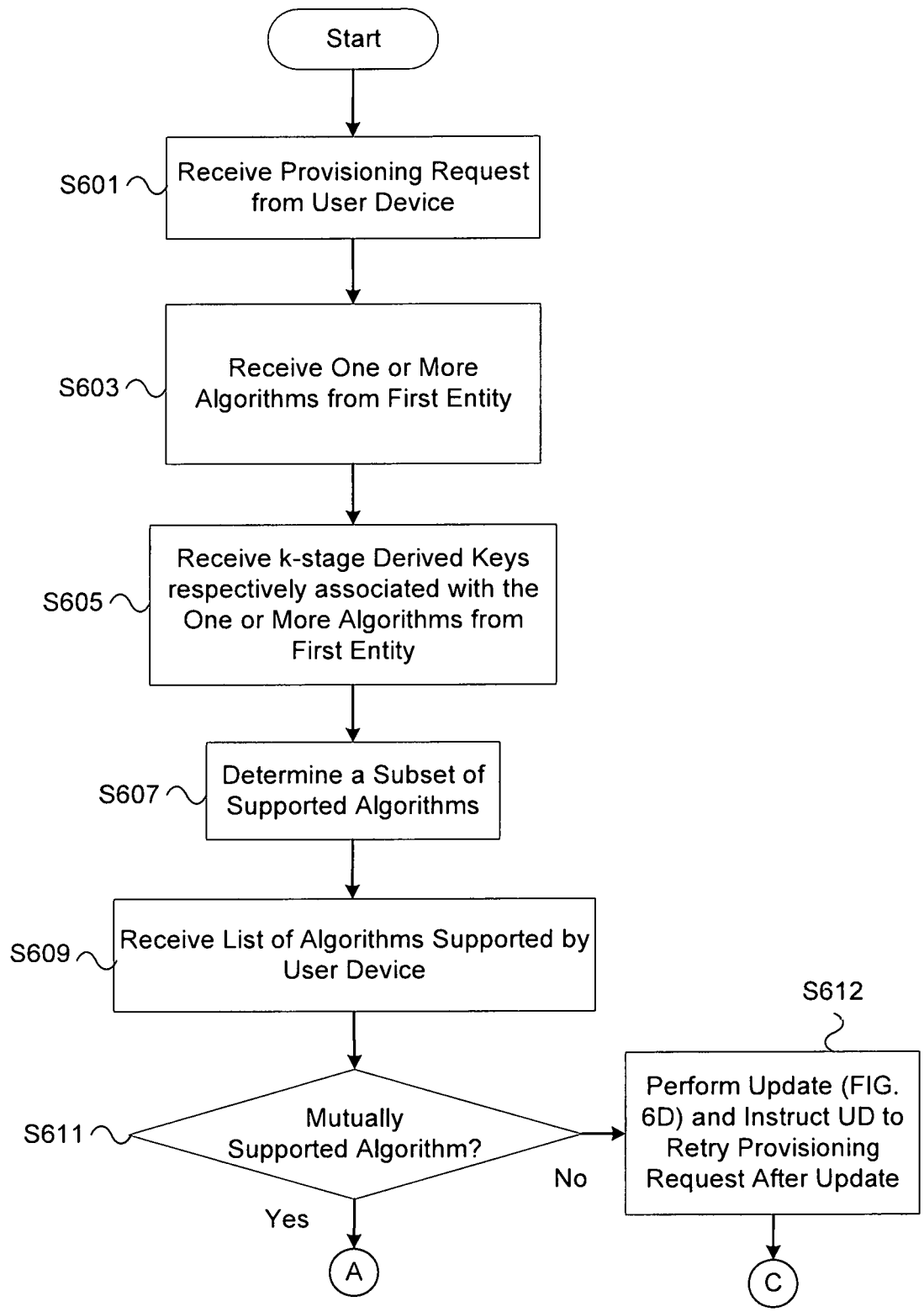
FIGS. 6A-6C are flow charts showing an example method for authenticating a user device using a mutually supported key derivation algorithm.
Figure 6B:
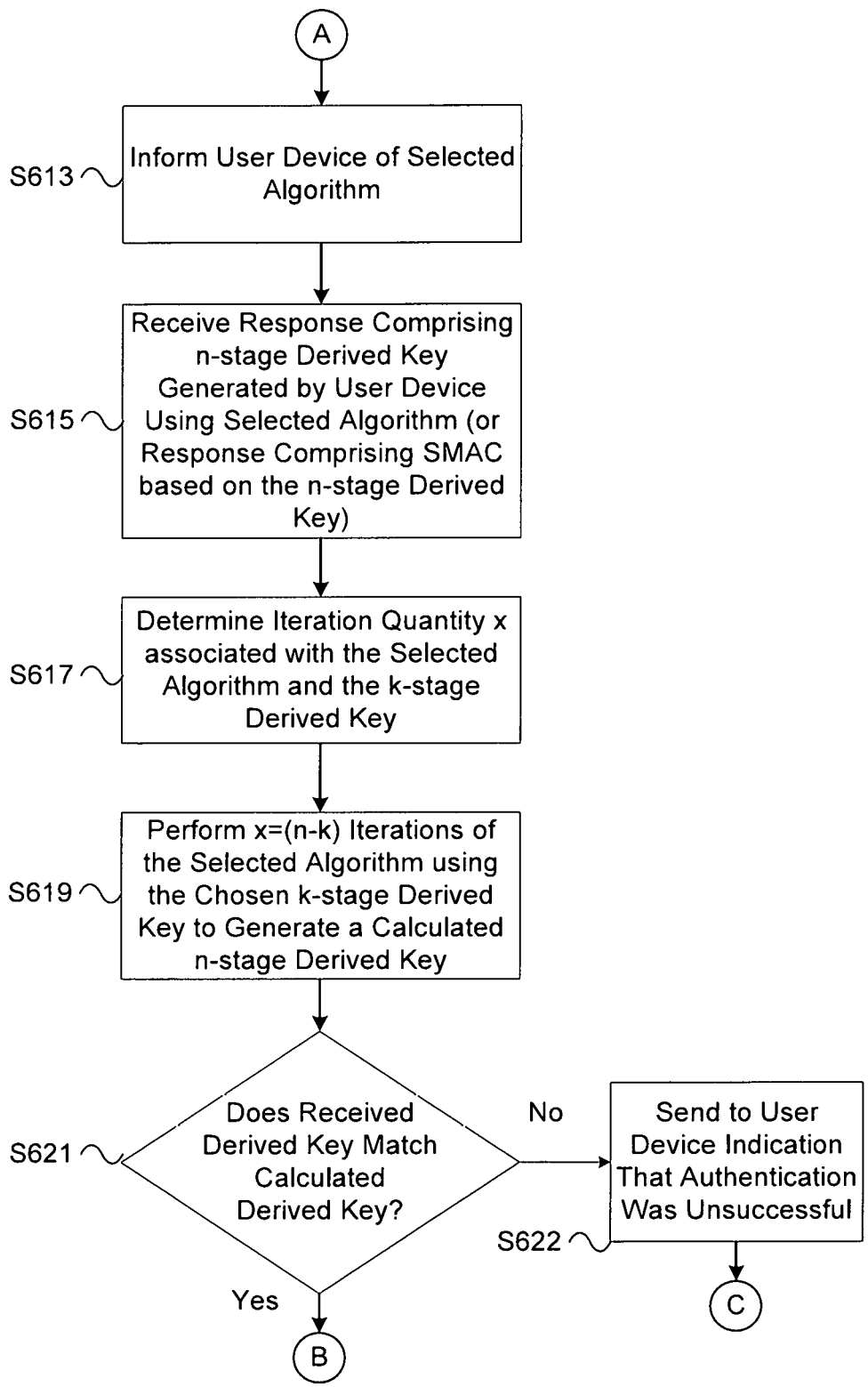
Figure 6C:
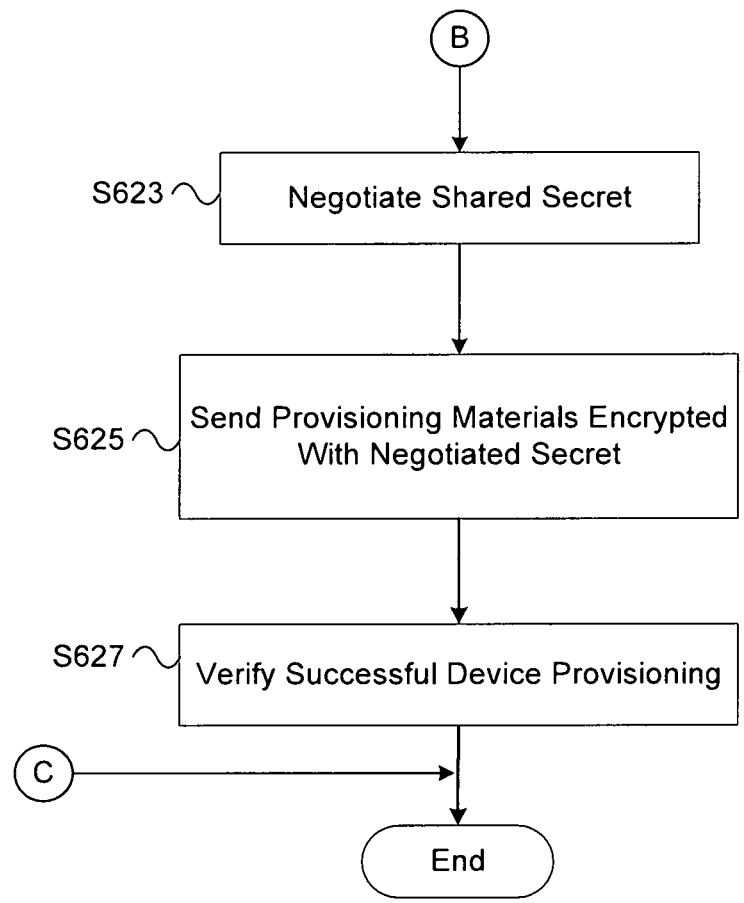

FIGS. 6A-6C are flow charts showing an example method for authenticating a user device using a mutually supported key derivation algorithm. One or more steps shown in FIGS. 6A-6C may be performed by, e.g., the second entity 320 described above. In step S601, the second entity 320 may receive a provisioning request from the user device. The computing device may also receive a Media Access Control (MAC) address and/or other device identifier of the user device requesting provisioning. The second entity 320 may receive the request for device provisioning and may contact another entity (e.g., the first entity 310), requesting derived keys that correspond to the device identifier of the user device. In step S603, the second entity 320 may receive, from the another entity, one or more key derivation algorithms associated with the user device. In step S605, the second entity 320 may receive, from the another entity, k-stage derived keys respectively associated with the key derivation algorithms. Additionally, or alternatively, the second entity 320 may receive, before receiving a provisioning request from the user device, key derivation algorithms and k-stage derived keys that correspond to the device identifier of the user device.

In step S607, the second entity 320 may determine a subset of supported algorithms associated with the user device. In step S609, the second entity 320 may receive a list of algorithms supported by the user device. In step S611, the second entity 320 may determine whether there are one or more mutually supported algorithms based on the received list and the determined subset. If yes, the second entity 320 may select a mutually supported algorithm and may perform step S613 in FIG. 6B. If no, the second entity 320 may perform an update (e.g., FIG. 6D) and instruct the user device to retry a provisioning request after the update.

In step S613 (FIG. 6B), the second entity 320 may inform the user device of the selected algorithm mutually supported by the second entity 320 and the user device. In step S615, the second entity 320 may receive, from the user device, a response comprising an n-stage derived key. Alternatively, the second entity 320 may receive, from the user device, a response comprising an SMAC based on the n-stage derived key. In step S617, the second entity 320 may determine an iteration quantity x associated with the selected algorithm and the k-stage derived key. Alternatively, if the second entity 320 receives the value pair (n, k), the iteration quantity value of x may be calculated by the equation: x=n−k. In step S619, the second entity 320 may perform x iterations of the selected algorithm to generate a calculated n-stage derived key. The second entity 320 may also, if the response received from the user device comprises the SMAC, generate an SMAC_SP based on the calculated n-stage derived key. In step S621, the second entity 320 may determine whether the received n-stage derived key matches the calculated n-stage derived key. Alternatively, the second entity 320 may determine whether the received SMAC matches the generated SMAC_SP. If the two n-stage derived keys (or the received SMAC and the generated SMAC_SP) do not match each other, the second entity 320 may determine, in step S622, that the authentication of the user device is unsuccessful and send, to the user device, an indication that the authentication was unsuccessful. The indication may trigger the user device to resend a provisioning request and the second entity 320 may perform step S601.

If a match is determined in step S621, the second entity 320 may negotiate, in step S623 (FIG. 6C), a shared secret with the user device. The shared secret may be used to encrypt and/or encode subsequent communications between the second entity 320 and the user device. For example, various encryption schemes and/or cryptography key protocols (e.g., Diffie-Hellman) may be used for a shared secret between the second entity 320 and the user device. In step S625, the second entity 320 may send, to the user device, provisioning materials encrypted and encoded with the negotiated secret. In step S627, the second entity 320 may determine a successful device provisioning for the user device. After the successful provisioning, the second entity 320 and the user device perform subsequent data communications.

The first entity 310, the second entity 320, and/or the user device may determine an algorithm update event. For example, and as described above, the second entity 320 may determine, in connection with a provisioning request, that there is no mutually-supported algorithm. As another example, if data stored by the second entity 320 is compromised (a compromise event), the first entity 310 and/or the second entity 320 may invalidate one or more k-stage derived keys and key derivation algorithms. The first entity 310 may update the second entity 320 and user devices with one or more new key derivation algorithms and related information (e.g., an iteration value of n for the user device, one or more input parameters <params>, an iteration value of x for the second entity 320, a k-stage derived key for the second entity 320, association data between the new key derivation algorithm and the k-stage derived key, etc.).

Figure 6D:
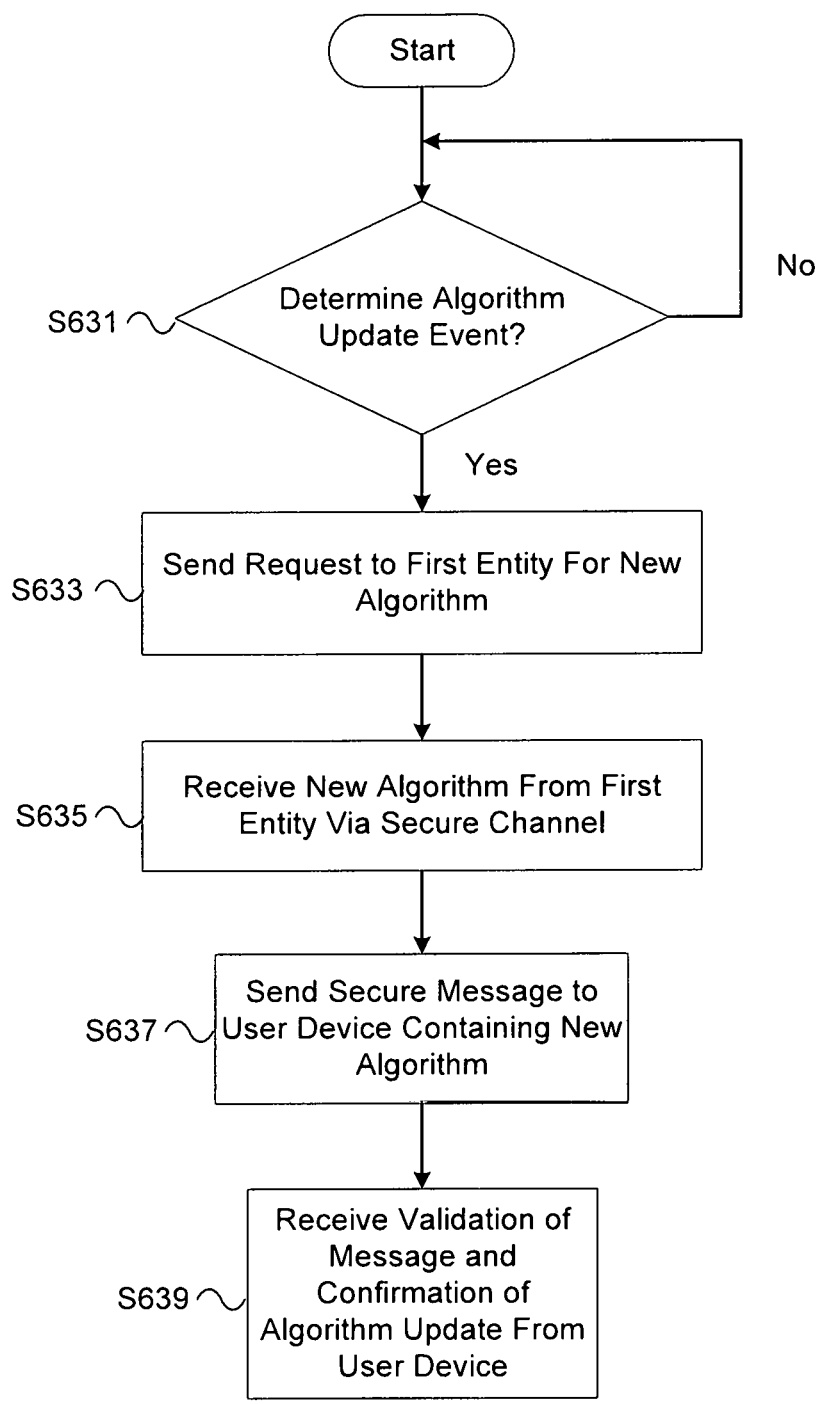
FIG. 6D is a flow chart showing an example method for updating a key derivation algorithm.

FIG. 6D is a flow chart showing an example method for updating a key derivation algorithm. In step S631, the first entity 310 and/or the second entity 320 may monitor for a key derivation algorithm update event. An update event may be the result of a determination of no mutually-supported algorithm, as described in connection with step S612 of FIG. 6A. An update event can be security related, e.g., the result of a breach, a hacking, or a compromise event. If a compromise event occurs, one or more k-stage derived keys and one or more key derivation algorithms stored in the second entity 320 may be deprecated (e.g., invalidated or replaced with a new algorithm). As another example of an algorithm update event, the first entity 310 may periodically generate new derivation algorithms and new k-stage derived keys and may send the new algorithms and derived keys to the second entity 320 and/or to one or more other entities for update.

If no update event occurs, the second entity 320 and/or the first entity 310 may repeat step S631. If an update event occurs, the second entity 320 may send, in step S633, a request to the first entity 310 for a new key derivation algorithm, and the first entity 310 may send, in response to the request, the new key derivation algorithm to the second entity 320 (or the first entity 310 may determine to send, to the second entity 320, the new key derivation algorithm even if the second entity 320 does not send the request to the first entity 310). In step S635, the second entity 320 may receive the new key derivation algorithm from the first entity 310 via a secured channel. For example, the first entity 310 may send, to the second entity 320, encrypted data comprising the new key derivation algorithms and k-stage derived keys. The encrypted data may be signed and encrypted by the first entity 310, and the second entity 320 may be specifically designated as a valid recipient.

In step S637, the second entity 320 and/or the first entity 310 may send, to the user device and via a secured channel, a message comprising the new key derivation algorithm and the related information (e.g., an iteration value of n for the user device, one or more input parameters <params>, association data between the new key derivation algorithm and the iteration value of n, etc.). For example, the second entity 320 may generate an out of band (OOB) message that is signed and encrypted by the second entity 320 (or the first entity 310) to deliver the new key derivation algorithm to the user device. For example, an OOB message may be sent over a dedicated communication channel via which control information is exchanged between the second entity 320 and the user device, and which may be separate from the channel used for provisioning. The dedicated communication channel may be uniquely established based on a specific function of a firmware of the user device. The user device may receive the OOB message and may initiate a firmware update. Based on receiving the OOB message, the user device may validate the integrity of this update command by verifying the received message.

In step S639, the second entity 320 and/or the first entity 310 may receive, from the user device, a validation responsive to the message. The second entity 320 and/or the first entity 310 may also receive, from the user device, a confirmation that the user device updated the new key derivation algorithm in a list of key derivation algorithms in a storage of the user device. From the user device perspective, the user device may validate, based on receiving the OOB message, the received OOB message and decrypt the payload of the OOB message. The user device may verify the signature in the payload to perform the firmware update. If all of the verifications are successful, the user device may update the new key derivation algorithm or replace the unsecure key derivation algorithm with the new key derivation algorithm.

If the update event was determined because the second entity 320 previously determined that there was no mutually-supported algorithm, the user device may resend a provisioning request. If the update event was determined because of a security-related reason, or other reasons, and the user device had already been provisioned, the user device may subsequently use the new algorithm to perform re-authentication and re-provisioning operations. A user provisioning between the second entity 320 and the user device may be repeated in certain situations, e.g., the user device lost power and needed to be re-provisioned.

Figure 7A:
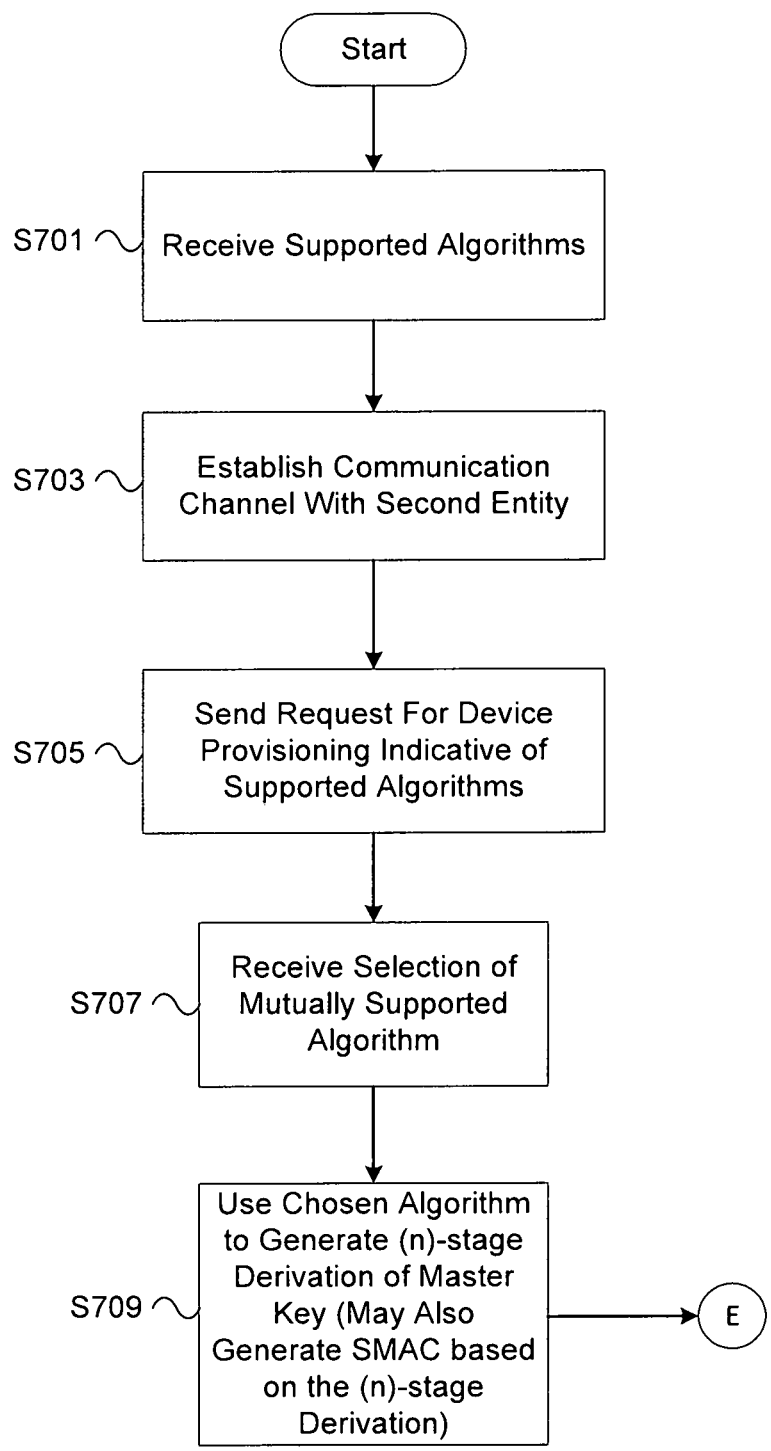
FIGS. 7A and 7B are flow charts showing an example method for deriving a secured key by a user device.
Figure 7B:
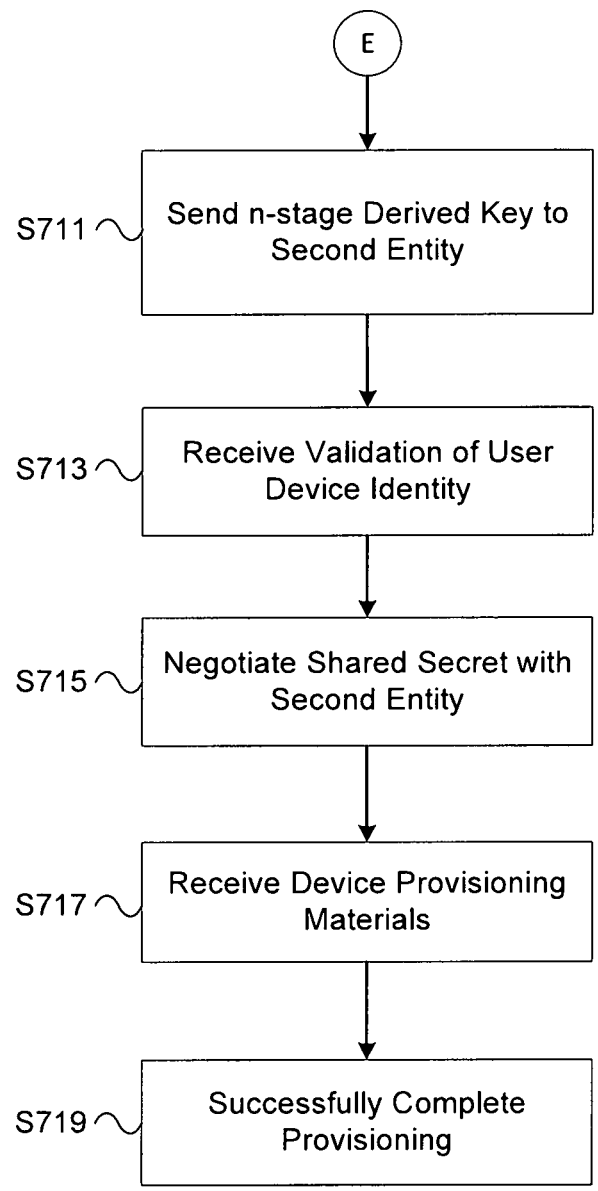

FIGS. 7A and 7B are flow charts showing an example method for deriving a secured key by a user device. One or more steps shown in FIGS. 7A and 7B may be performed by a user device, e.g., the user device 330 described above or another user device. In step S701, the user device may receive one or more key derivation algorithms associated with the user device. The one or more key derivation algorithms may be received from second entity 320 and/or the first entity 310 and may be used for an authentication process between the second entity 320 and the user device. The user device may also receive information indicating an iteration quantity (e.g., the number n) associated with each key derivation algorithm. In step S703, the user device may establish a communication channel with the second entity 320. In step S705, the user device may send, to the second entity 320, a request for device provisioning and a list of one or more key derivation algorithms supported by the user device. In step S707, the user device may receive, from the second entity 320, a selection of a mutually supported algorithm. In step S709, the user device may use the selected algorithm and a master key stored in the user device to generate an n-stage derived key. The user device may also generate, based on the n-stage derived key, the SMAC or other value.

In step S711 (FIG. 7B), the user device may send, to the second entity 320, the n-stage derived key. Alternatively, the user device may send, to the second entity 320, the SMAC (or other value) based on the n-stage derived key. In response to sending the n-stage derived key, the user device may receive, from the second entity 320 and in step S713, a validation of the user device identity with a protocol to set up a shared secret. In step S715, the user device may negotiate with the second entity 320 a shared secret to be used for subsequent communications. In step S717, the user device may receive, from the second entity 320 and by using the shared secret, device provisioning materials. In step S719, the user device may determine that the device provisioning is complete.

Figure 7C:
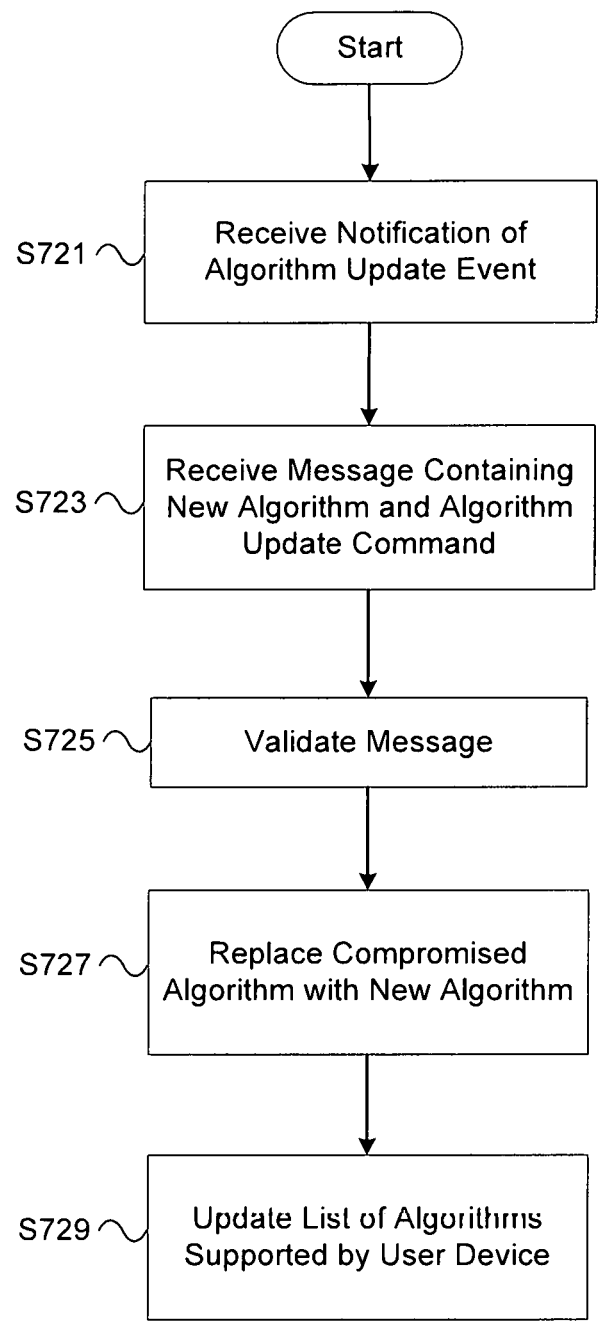
FIG. 7C is a flow chart showing an example method for updating a new key derivation algorithm by a user device.

FIG. 7C is a flow chart showing an example method for updating a new key derivation algorithm by a user device. One or more steps shown in FIG. 7C may be performed by a user device, e.g., the user device 330 described above or another user device. In step S721, the user device may receive, via a shared secret, a notification of an algorithm update event. The notification may be received from the second entity 320 and/or the first entity 310. In step S723, the user device may receive, via a secured channel, an encrypted message comprising a new key derivation algorithm and an algorithm update command. The encrypted message may be the OOB message described above and may trigger a firmware update in the user device. In step S725, the user device may decrypt and validate the encrypted message. The user device may validate the integrity of an algorithm update command by verifying the content of the encrypted message. For example, the user device may verify a signature in a payload of the decrypted message. The signature may comprise a device identification that uniquely identifies the second entity 320. Asymmetric key cryptography using pre-provisioned public/private keys may be used for the verification process. For example, the public key or the private key for the verification process may be secured in the user device (e.g., in one-time programmable memory or in a firmware image that has previously been validated during a secured boot sequence). The other key (the private key or the public key) may be secured in the second entity 320 and may be used to generate the encrypted message. Based on validating the received message, the user device, in step S727, may replace one or more compromised key derivation algorithms with one or more new key derivation algorithm. The algorithm replacement may be performed via a firmware update process. The firmware update process may be performed based on a user selection. The firmware update process may be automatically performed without a user approval in certain conditions (e.g., when there is no mutually supported key derivation algorithm between the second entity 320 and the user device or all of the key derivation algorithms in the user device have been compromised). In certain conditions (e.g., when a compromise or breach occurs in computing devices in the second entity 320), the steps shown in FIG. 7C may be performed between the first entity 310 and the user device. For example, the first entity 310 may provide the notification and the encrypted message shown in steps S721 and S723. In step S729, the user device may update the list of algorithms supported by the user device.

Different user devices may support different key derivation algorithms depending upon, for example, initial settings included in a manufacture process, firmware updates, etc. The second entity 320 may select, for each user device, a mutually supported key derivation algorithm, from the one or more key derivation algorithms and use the mutually supported key derivation algorithm to verify an identity of that user device during provisioning. In the event that the mutually supported key derivation algorithm installed on that user device is compromised, the second entity 320 may request the first entity 310 for a new key derivation algorithm. The second entity 320 may send the new key derivation algorithm to the user device via a secured channel to enable a replacement of compromised firmware on the user device in a timely and convenient manner. The firmware update may be performed by the first entity 310 without involving the second entity 320. The first entity 310 may provide a secure environment for storage of the derived keys and key derivation algorithms.

New key derivation algorithms associated with a user device may be updated in the user device via an automatic firmware update. This automatic firmware update may be performed periodically or may be forced by second entity 320 if the second entity 320 (or the first entity 310) determines an algorithm update event, e.g., no mutually supported key derivation algorithm exists between the second entity 320 and the user device.

Figure 8:
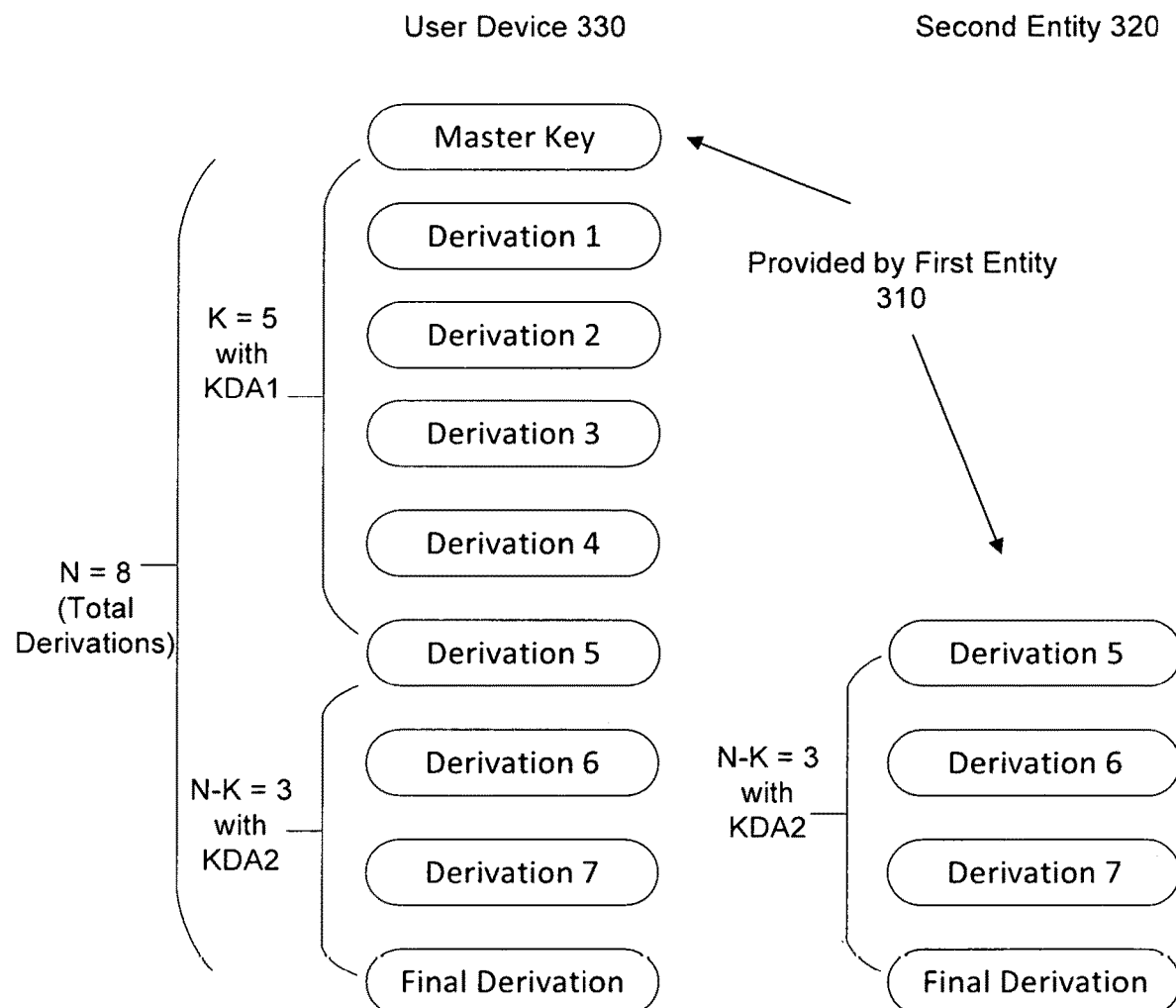
FIG. 8 shows example key derivations by a user device and by a service provider.

FIG. 8 shows example key derivations by a user device and by the second entity 320. The key derivation scheme shown in FIG. 3B may be replaced with the key derivation scheme shown in FIG. 8. Similar to FIG. 3B, the user device 330 may have a master key, and the second entity 320 may have a k-stage derived key. The k-stage derived key may be derived by using the master key and based on k iterations of a first key derivation algorithm KDA1. Based on selection of a mutually-supported second key derivation algorithm KDA2, the user device 330 and the second entity 320 each may derive a derived key by using (n−k) iterations of the selected key derivation algorithm KDA2. The user device 330 may retrieve the master key stored in the user device 330 and may obtain a k-stage derived key from the master key based on k iterations of KDA1. The user device 330 may use the k-stage derived key as an input to the first iteration of the mutually supported algorithm KDA2. The user device 330 may obtain a final derived key from the k-stage derived key and based on (n−k) iterations of the mutually supported algorithm KDA2.

The second entity 320 may not have the master key. Instead, the second entity 320 may receive a k-stage derived key from the first entity 310 (or other key storage devices). The second entity 320 may also not have the key derivation algorithm KDA1. The second entity 320 may store a k-stage key, derived from a master key of the user device 330 by using KDA1, that was received from the first entity 310. The first entity 310 may send, to the second entity 320, an iteration quantity value of x that corresponds to (n−k). The key derivation algorithm KDA2 may be provided from the first entity 310 to the second entity 320 with an indication that KDA2 is associated with the user device 330. The user device 330 may generate a final derived key (e.g., an n-stage key) using k iterations of the key derivation algorithm (KDA1) and (n−k) iterations of the selected key derivation algorithm (KDA2). The second entity 320 may receive the final derived key (or the SMAC based on the final derived key) from the user device and may derive its own final key from the k-stage key based on x iterations of the key derivation algorithm KDA2. The second entity 320 may, if the SMAC is received from the user device 330, also generate the SMAC_SP based on its own final key.

The final derived key of the user device 330 (or the SMAC) may match the final derived key of the second entity 320 (or the SMAC_SP). Because the key derivation algorithm KDA1 may be unknown to the second entity 320, it may be provided from the first entity 310 to the user device 330 via a secured channel between the first entity 310 and the user device 330. The value k and/or the value n may also be provided to the user device 330 from the first entity 310 via a secured channel.

The value n may be implicitly derived based on the master key and/or KDA1. The first entity 310 and a user device may agree to determine the value n based on a predetermined rule. For example, the value n may be determined from a 1-stage derived key derived based on the master key and KDA1. If the 1-stage derived key is a hash value, e.g., f7bc9685b8a74rt090701a7d3k4, the first character of the hash value "f" may be identified. A table may indicate each character associated with a unique value of n. For example, the first character of hash value "a" may indicate n=10 and the first character of hash value "f" may indicate n=15. If the first character of the hash value is a number, n may be 30 plus that number. Based on a calculated value of n, the user device may calculate the value k based on receiving the value x=(n−k), from the second entity 320, with a request for (n−k) iterations of KDA2.

KDA1 and KDA2 and related information in a user device may be replaced with new key derivation algorithms in a manner similar to that described in connection with FIG. 6D. Because KDA1 is not used by the second entity 320, KDA1 may only run on specific firmware of the user device 330 that works in conjunction with particular hardware of the user device 330. This configuration may prevent spoofing or other malicious attacks because the configuration is based on particular hardware functions of the user device 330.

The following pseudocode provides an example of how the user device 330 may generate a derived key in a process such as that shown in FIG. 8.

```
i = 0
keyD(0) = keyM
WHILE i < k
    increment i by +1
    keyD(i) = KDA1(keyD(i−1), <params1>)
ENDWHILE
WHILE k ≤ i <n
    increment i by +1
    keyD(i) − KDA2(keyD(i−1), <params2>)
ENDWHILE
keyD_UD = keyD(i)
```

In the above pseudocode, "keyM" is the master key for the user device 330, "i" is an iteration counter, and "keyD(i)" is an $i^{th}$ stage (from the master key) derived key. "KDA1( )" is a key derivation algorithm1, "KDA2( )" is a key derivation algorithm2.

One of the inputs to the key derivation algorithm KDA1( ) (or to the key derivation algorithm KDA2( )) for the $i^{th}$ iteration is the $(i-1)^{th}$ stage derived key. The key derivation algorithm KDA1( ) may also include one or more additional input parameters, shown generically as "<params1>." The key derivation algorithm KDA2( ) may also include one or more additional input parameters, shown generically as "<params2>." The additional <params1> input(s) for the KDA1( ) and the additional <params2> input(s) for the KDA2( ) may be identical or may be different. The additional <params1> input(s) and/or the additional <params2> input(s) may be omitted. The derived key generated by the user device 330 based on total n iterations is shown in the above pseudocode as "keyD_UD." This derived key may be sent to the second entity 320 for authentication of the user device.

The following pseudocode provides an example of how the second entity 320 may obtain a derived key, for comparison with a derived key received from the user device 330, in a process such as that shown in FIG. 8.

```
j = 0
keyD(0) = keyD(k)
WHILE j < (n−k)
    increment j by +1
    keyD(j) = KDA2(keyD(j−1), <params2>)
ENDWHILE
keyD_SP − keyD(j)
```

In the above pseudocode, "keyD(k)" is a k-stage (from the master key) derived key. The second entity 320 may receive keyD(k) for the user device 330 from the first entity 310. The variable "j" is an iteration counter, and "keyD(j)" is a derived key resulting from j iterations of the key derivation algorithm2 "KDA2( )" that begin with keyD(k) as an initial input. "KDA2( )" is the same key derivation algorithm used by the user device 330. The derived key generated by the second entity 320 based on the (n–k) iterations is shown in the above pseudocode as "keyD_SP." This derived key (or an SMAC_SP based on keyD_SP) may be compared to the derived key (or an SMAC based on the derived key of the user device 330) received from the user device 330 for authentication of the user device 330, e.g., the user device 330 may be determined authentic if keyD_SP=keyD_UD (or if SMAC_SP=SMAC). The key derivation algorithm KDA2( ) may also include one or more additional input parameters, shown generically as "<params2>," which may be identical to the one or more additional input parameters, shown as "<params2>" that may be used by the user device 330.

In the example of FIG. 8, n=8 and k=5. However, n and k may have any positive integer values and n may be greater than k.

Although FIG. 8 shows only two different key derivation algorithms in deriving the n-stage derived key, more than two key derivation algorithms may be used to derive an n-stage key by the user device. The user device may communicate with a third entity, which may be a contractor, an intermediate service provider, or other entity, that directly communicates with the first entity 310. In an example, the first entity 310 may run total x iterations of a key derivation algorithm1 (KDA1), the second entity 320 (e.g., a first service provider) may receive an x-stage derived key from the first entity 310 and may run total y iterations of a key derivation algorithm2 (KDA2), and the third entity (e.g., a second service provider) may receive a (x+y)-stage derived key from the second entity 320 and may run total z iterations of a key derivation algorithm3 (KDA3). The user device may receive the KDA1, KDA2, and KDA3 from the third entity and may generate an n-stage derived key from the master key of the user device based on a sequential operation of x iterations of KDA1, y iterations of the KDA2, and z iterations of the KDA3. KDA1 may be sent from the first entity 310 to the user device, KDA2 may be sent from the second entity 320 to the user device, and KDA3 may be sent from the third entity to the user device.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a second computing device from a user device, a message based on a first key that was derived by the user device based on application of a key derivation algorithm to a master key;
receiving, by the second computing device from a first computing device different from the user device, a second key, wherein the second key is different from the first key and different from the master key and wherein the second key was derived by the first computing device based on application of the key derivation algorithm to the master key;
deriving, by the second computing device based on application of the key derivation algorithm to the second key, a derived key; and
authenticating, by the second computing device, the user device based on the message and the derived key.

2. The method of claim 1, further comprising:
receiving, from the user device, a list comprising two or more key derivation algorithms supported by the user device; and
determining, based on the list, that the user device supports the key derivation algorithm.

3. The method of claim 1, wherein the first key was derived, by the user device, based on application of a first quantity of iterations of the key derivation algorithm to the master key as an initial input, the second key was derived, by the first computing device based on application of a second quantity of iterations of the key derivation algorithm to the master key as an initial input, the first key is derivable based on application of a third quantity of iterations of the key derivation algorithm to the second key as an initial input, and the first quantity is a sum of the second and the third quantities.

4. The method of claim 1, further comprising:
receiving, by the second computing device and from the first computing device, an updated second key and an updated key derivation algorithm associated with the updated second key; and
replacing the key derivation algorithm with the updated key derivation algorithm and the second key with the updated second key.

5. The method of claim 1, further comprising:
sending, to the user device based on a determination that the user device supports an updated key derivation algorithm, a request for an updated message; and
authenticating, based on the updated message and a key derived based on the updated key derivation algorithm, the user device.

6. The method of claim 1, further comprising:
encrypting, based on the authenticating and based on an encryption protocol shared between the second computing device and the user device, provisioning data; and
sending, to the user device, the encrypted provisioning data.

7. The method of claim 1, further comprising:
determining, based on a list of key derivation algorithms received from the user device, that the user device does not support the key derivation algorithm; and
sending, to the user device, via a secured channel, and based on the determining that the user device does not support the key derivation algorithm, the key derivation algorithm.

8. A method comprising:
receiving, from a user device, a list comprising two or more key derivation algorithms supported by the user device;
determining, by a second computing device and based on the received list, that a key derivation algorithm supported by the second computing device is not indicated by the list; and
sending, to the user device via a secured channel, and based on the determining that the key derivation algorithm supported by the second computing device is not indicated by the list, the key derivation algorithm supported by the second computing device.

9. The method of claim 8, further comprising:
receiving, from the user device, a message based on a first key derived using the key derivation algorithm supported by the second computing device; and
based on the message, authenticating, by the second computing device and using a second key different from the first key, the user device, wherein the using the second key comprises deriving, based on application of the key derivation algorithm supported by the second computing device to the second key, the first key.

10. The method of claim 8, further comprising:
encrypting, before the sending the key derivation algorithm supported by the second computing device, and based on a digital signature, the key derivation algorithm supported by the second computing device.

11. A method comprising:
deriving, by a second computing device without access to a master key, and based on a second key as an initial input to a third quantity of iterations of a key derivation algorithm, a derived key;
receiving, by the second computing device from a user device, a message based on a first key, wherein the first key was derived by the user device based on the master key as an initial input to a first quantity of iterations of the key derivation algorithm, wherein the first key is different from the second key and different from the master key, and wherein the first quantity is greater than the third quantity; and
authenticating, by the second computing device, the user device based on the derived key and the message.

12. The method of claim 11, wherein each iteration, if any, of the key derivation algorithm after a first iteration receives an output derived key of an immediately previous iteration as an input key.

13. The method of claim 11, wherein the second key is derived based on performing a second quantity of iterations of the key derivation algorithm based on the master key as an initial input, wherein the first quantity is a sum of the second and the third quantities.

14. The method of claim 11, further comprising sending, based on the authenticating, provisioning data to the user device.

15. The method of claim 11, further comprising:
receiving, from the user device, a request indicating a plurality of algorithms including the key derivation algorithm; and
sending, to the user device, a message comprising an indication of the key derivation algorithm and requesting the message based on the first key.

16. The method of claim 1, wherein the message based on the first key comprises one or more of:
the first key;
a hash based on the first key; or
a secure message authentication code based on the first key.

17. The method of claim 1, wherein the authenticating based on the message and the derived key comprises authenticating the user device based on a comparison of the message and
a value generated by the second computing device based on the derived key.

18. The method of claim 1, wherein the second computing device does not have access to the master key, wherein the deriving the derived key comprises deriving based on one or more iterations of the key derivation algorithm, and wherein a first iteration, of the one or more iterations, used the second key as an input.

19. The method of claim 11, further comprising:
receiving, by the second computing device and based on a compromise of the key derivation algorithm, an updated key derivation algorithm and an updated third key; and
sending, to the user device and based on a determination that the user device supports the updated key derivation algorithm, an indication of the updated key derivation algorithm.

20. The method of claim 11, wherein the message based on the first key comprises the first key, a hash based on the first key, or a secure message authentication code based on the first key.

21. The method of claim 11, wherein the authenticating based on the message and the derived key comprises authenticating the user device based on a comparison of the message and
a value generated by the second computing device based on the derived key.

22. The method of claim 1, wherein the receiving the second key from the first computing device comprises receiving the second key from a secure key facility of the first computing device.

23. The method of claim 1, further comprising sending, by the first computing device, the master key to a manufacturer of the user device.

* * * * *

UNITED STATES PATENT AND TRADEMARK OFFICE
CERTIFICATE OF CORRECTION

PATENT NO. : 11,716,614 B2
APPLICATION NO. : 15/998493
DATED : August 1, 2023
INVENTOR(S) : Hess et al.

Page 1 of 1

It is certified that error appears in the above-identified patent and that said Letters Patent is hereby corrected as shown below:

In the Drawings

Sheet 3 of 16, Fig 3A, and on the title page, the illustrative print figure:
Insert --300-- therefor In the Specification Column 11, Detailed Description, Line 51:
Delete "310" and insert --320-- therefor Column 17, Detailed Description, Line 66:
Delete "f7bc9685b8a74rt090701a7d3k4," and insert --f7bc9b85b8a74rt090701a7d3k4,-- therefor In the Claims Column 22, Claim 17, Line 13:
After "and", delete "¶"

Column 22, Claim 21, Line 38:
After "and", delete "¶"

Signed and Sealed this
Twenty-sixth Day of November, 2024

Katherine Kelly Vidal
*Director of the United States Patent and Trademark Office*